US006934641B2

(12) United States Patent
Chapman et al.

(10) Patent No.: US 6,934,641 B2
(45) Date of Patent: Aug. 23, 2005

(54) MOTION DETECTION AND ANALYSIS

(75) Inventors: Mark A. Chapman, Wotton-Under-Edge (GB); Raymond J. Chaney, Berkeley (GB); Sergey Loukianov, Stroud (GB); Seamus McFadden, Dowend (GB)

(73) Assignee: Renishaw PLC, Gloucestershire (GB)

( * ) Notice: Subject to any disclaimer, the term of this patent is extended or adjusted under 35 U.S.C. 154(b) by 0 days.

(21) Appl. No.: 10/608,619

(22) Filed: Jun. 30, 2003

(65) Prior Publication Data

US 2004/0107068 A1 Jun. 3, 2004

Related U.S. Application Data

(63) Continuation-in-part of application No. 09/716,959, filed on Nov. 22, 2000, now abandoned.

(30) Foreign Application Priority Data

Nov. 24, 1999 (GB) .............................................. 9927729
May 21, 2003 (GB) .............................................. 0311655

(51) Int. Cl.[7] .............................................. G06F 15/00
(52) U.S. Cl. ..................................................... 702/33
(58) Field of Search ......................... 702/33, 189, 501; 250/231; 364/561, 486; 356/336, 338; 33/701; 336/499; 348/169, 219, 157; 396/121, 153

(56) References Cited

U.S. PATENT DOCUMENTS

| 4,338,672 | A | | 7/1982 | Perzley et al. .............. 364/513 |
| 5,512,974 | A | | 4/1996 | Abe et al. .................... 354/430 |
| 5,719,789 | A | * | 2/1998 | Kawamata ................... 702/189 |
| 6,222,181 | B1 | * | 4/2001 | Ichigaya ................ 250/231.13 |

FOREIGN PATENT DOCUMENTS

| EP | 0 704 678 A1 | 4/1996 |
| EP | 0753804 | 1/1997 |
| GB | 2296766 | 7/1996 |

OTHER PUBLICATIONS

'Digital Signal Processing Applications Using the ADSP–2100 Family, vol. 2' by The Application Engineering Staff of Analogue Devices DSP Division; Edited by Jere Babst; TRP Prentice Hall 1995; IBSN 0–13–178567–2; pp. 46–55.

'Digital Signal Processing Applications with Motorola's DSP5602 Processor' by Mohamed El–Sharkawy; Prentice Hall PTR 1996; IBSN 0–13–569746–0; pp. 157–165.

* cited by examiner

*Primary Examiner*—Michael Nghiem
*Assistant Examiner*—Tung S. Lau
(74) *Attorney, Agent, or Firm*—Oliff & Berridge, PLC

(57) ABSTRACT

In order to determine movements of two subjects, two or more signals of different phase are obtained which depend on the movement, and processed by locating constellation status of the signals in at least one co-ordinate axis system, it must have at least six separate segments rotationally displaced. Where there are two or more co-ordinate axis systems, each must have an axis radiating from an origin. The change in the constellation states is monitored using at least two processed data samples obtained by sampling the signals at a suitable clock rate. It is possible to derive a prediction of values of the signal and filter the signals in dependence on the prediction. The second co-ordinate axis system may be rotatable relative to the first co-ordinate axis system enabling the provision of a movable region of uncertainty.

45 Claims, 17 Drawing Sheets

Timing diagram for over sampling

MOTION DETECTION AND ANALYSIS

This is a Continuation-in-Part of application Ser. No. 09/716,959 filed Nov. 22, 2000 now abandoned. The entire disclosure of the prior application is hereby incorporated by reference herein in its entirety.

BACKGROUND OF THE INVENTION

The present invention relates to the detection and analysis of motion. It is particularly, but not exclusively, concerned with detection of motion measured by interferometer or encoder systems.

It is known to detect movement using interferometry techniques that provide a sensitive way of detecting even small displacements. EP-A-0753804 and GB-A-2296766 disclose examples of such interferometer measuring systems. Similarly, encoders based on the overlap of a scale with an array of sensors can provide accurate measurement. The scale comprises a series of marks. As the marks move relative to the sensors, the relative displacement between the scale and the sensors can be measured on the basis of the output of the respective sensors.

In such systems, the simplest case is where there are two sensors which differ by 90° in phase, for example one producing a sine output whilst the other produces a cosine output. If these are presented on mutually orthogonal axes, the possible outputs can be considered as being within a detection circle centred on the origin of the co-ordinate axes—a Lissajous figure.

At its simplest, that co-ordinate system may represent displacement.

A given point within the circle may be represented by two polar co-ordinates: angle and radius. The radius is a measure of the magnitude of the signal strength, and the angle is a measure of displacement. As the angular ordinate increases or decreases the displacement measured by the system increases or decreases. The displacement resolution of the system is limited by the precision to which the angular ordinate can be measured.

Suppose now the signals are sensed at periodic time intervals. The value obtained at any sensing point will be somewhere within the detection circle. Consider the circle to be divided into 90° segments. In conventional systems the current position (angular segment) is compared with the previous position. There are four possible answers. If the segmental difference is zero, then the system assumes that the system has remained "stationary". If the difference is +1 then the system assumes that the displacement has positively increased, and if the difference is −1 then the system assumes that the displacement has negatively increased. Finally if the difference is either +2 or −2 then the system flags an over speed error since the system cannot decide whether the system has moved in the positive or negative direction. There are two possible reasons why the system flags a movement by two segments: either the system is moving at sufficient speed to generate a two segment displacement, in which case the system flags a genuine over speed error; or the signals being processed are noisy, in which case the system flags an over speed error inadvertently. These difficulties can be reduced by processing in smaller segments, but again there is always one segment which does not carry sufficient information about how it is reached.

SUMMARY OF THE INVENTION

The present invention seeks to overcome the over speed problem even when the sampling rate is below the analogue bandwidth, and to make the system less susceptible to noise.

At its most general, the present invention proposes that the analysis of two signals, preferably in quadrature (sine and cosine signals), is on the basis of a high resolution co-ordinate axis system, or at least two independent systems of co-ordinate axes, which are rotationally displaced.

Thus, according to a first aspect of the present invention there may be provided:

means for generating at least two signals of different phase, preferably in quadrature, in dependence on the relative position of two objects, movement of the two objects causing corresponding changes in the at least two signals; and a processor for processing the at least two signals, thereby to determine said movement, the processing being of the basis of locating the constellation states of successive values of the at least two signals in at least one co-ordinate axis system, the co-ordinate axes systems describe at least six separate segments rotationally displaced, and monitoring the change in the constellation states of the successive values by using at least two processed data samples, the successive samples are obtained by sampling the at least two signals at a suitable clock rate.

In arrangements in which there is a single axis system, the minimum requirement is that the co-ordinate system is split into at least six sextants. Where there are multiple co-ordinate axis systems, the requirement for at least six segments represents the requirement for the total number of segments from all systems added together.

Suppose now that the quantity being measured is displacement. It is a constraint on traditional systems that satisfactory movement can only result in a change no greater than from one segment to an adjacent one. Movements through three segments are not permitted, because system movement could be either positive or negative to achieve this result and hence ambiguous. The traditional interpretation prohibits an unambiguous interpretation, and the system would flag an error.

Rather than having a displacement constraint on the system, it is possible to have a velocity constraint, so that the change in velocity is no more than one increment between processed data samples. In this invention velocity is represented by the number of segments jumped between clock samples. In traditional systems the maximum velocity in a four quadrant system is ±1, as a jump of two segments would flag an over speed error, in a six sextant system the maximum velocity would be ±2 as a jump of three would flag an over speed error. In this invention this limitation is removed, but in the simplest implementation of the invention the change in velocity (i.e. acceleration) between clock samples is restricted to 0, ±1 and ±2.

Thus, in the arrangements involving a single axis system, this invention considers constraints on change in velocity, or change in acceleration, or higher derivative rather than the change in displacement. Constraining the change in velocity needs two measurements, whilst constraining the change in acceleration needs three (more measurements may be taken to provide a more accurate prediction).

To illustrate this change in concept consider the following measurement sequence:

first two measurements are in the same segment (the first segment), third measurement is in the adjacent segment (the second segment), fourth measurement is a further 3 segments on (the fifth segment).

The velocity difference between the first and second measurement is zero, and hence is a valid measurement. The velocity difference between the second and third measurement is +1, and hence also represents a valid measurement. The velocity difference between the third and fourth measurement is 2, and hence is valid, but if the system was being analysed by the traditional method this movement is a jump of three segments and hence would represent an invalid move, thus the maximum constraint on velocity has been lifted.

In arrangements involving two or more co-ordinate axis systems the minimum requirement is that each axis system defines three segments for example, a first co-ordinate axis system defines three axes disposed at 120° with the origin of the co-ordinate system at their intersection, thereby defining the three segments, and a second axis system again has three axes at 120° which are at 60° to the axes of the first system and may intersect at the same point. Regardless of whether it is displacement, velocity, or acceleration that constrains the system, the use of two axis systems enables the proportion of the circle in which a valid signal is obtained to be increased compared to a one axis system.

For simplicity the invention will be briefly described having a first co-ordinate axis system that defines two axes at 90°, thereby defining four quadrants, and a second axis system which again has two axes at 90°, but these axes being at 45° to the axes of the first system. The four segments defined by each axis system preferably, have a common centre.

Suppose now that the quantity being measured is displacement, and it is a constraint on the system that satisfactory movement can only result in a change no greater than from one segment to an adjacent one. Movements through two segments are not permitted. A first measurement (assumed to be valid) is necessarily within a segment in each of the two co-ordinate axes. For the second measurement, there are several possibilities. The second measurement may be in a segment adjacent to the first in one co-ordinate system, but in the same segment in the second. This is clearly a valid measurement. Similarly, if the measurement point changes to an adjacent segment in both co-ordinate systems, again it is valid. If the measurement has changed by two segments in one co-ordinate system, but only one in another, then it is of doubtful validity, and if it changes by two segments in both co-ordinate systems it is clearly invalid, and in this case the system would flag an over speed error.

It should be noted that the arrangement described above used mutually perpendicular axes, but the invention is not limited to this and the axes can be regularly spaced by any angle. Similarly, although the two co-ordinate systems have been described as being at 45°, this is not necessary and the angle between them may be varied according to circumstances, as will be described later.

However, arrangements involving two or more co-ordinate axis systems are not limited to the situation where the two (or more) co-ordinate axis systems have the same number of axes. They may by different, although they preferably should not be multiples of each other, and have no common factors. Where there are two axis systems, suitable axis ratios include 4:7, 3:8, 5:8 and 7:8. Moreover, in such arrangements where the number of axes of the two (or more) co-ordinate axis systems are different, it is possible for one or more axes of one co-ordinate system to coincide with one or more axes of another axis system.

In a preferred embodiment, one of the co-ordinate axis systems is rotatable and prior to sampling the second processed data sample the rotatable co-ordinate axis system is rotated relative to the first signal such that the angular position of the first signal with respect to this rotatable co-ordinate axis system is known.

The present invention may also provide an apparatus for determining movement, comprising means for generating at least two signals of different phase in dependence on the relative position of two objects, movement of said two objects causing corresponding changes in said at least two signals; thereby to determine said movement, the processing by said processor being on the basis of locating the constellation states of successive values of the at least two signals in at least first and second co-ordinate axis systems, said at least first and second co-ordinate axis systems each defining at least three separate segments rotationally displaced, and said processing means is arranged to monitor the change in said constellation states of the successive values by using at least two processed data samples, said successive samples being obtained by sampling said at least two signals at a predetermined clock rate.

In the above discussion, it was assumed that it was a constraint on the system that satisfactory movement can only result in a change no greater than from one segment to an adjacent one. Rather than such a displacement constraint, it is possible to have a velocity constraint, so that the change in velocity is no more than one increment. In this invention velocity is represented by the number of segments jumped between clock samples. In traditional systems the maximum value for velocity is ±1, since a jump of two segments would flag an over speed error. In this invention this limitation is removed, but in the simplest implementation of the invention the change in velocity (acceleration) between clock samples is restricted to 0 and ±1. The constraints include the possibility that there is no velocity change. If velocity is then increasing, and assuming that the first measurement represents a stationary situation, then the first change may be from one segment to another (a velocity change of +1), the second change being two segments (a velocity change from 1 to 2) etc. It can be noted that if the velocity has incremented this way to a value of 2, for the next measurement to be not valid it would be in the same segment. Since that would now represent a change to velocity 0 or to velocity 4, hence a decrease of 2 or an increase of 2, which is outside the constraints required. More generally, the constraint may be that the quantity under consideration may only change by ±1 or 0. The constraint may be velocity, but could also be acceleration or jerk (rate of change of acceleration). The position of constraints represents development of the present invention as previously defined.

With a higher interpolation system, the constraint of ±1 can be raised. For example if the circle is divided into 8 segments instead of 4 then the maximum constraint would be ±3, although in practice one may wish to reduce it to ±2.

It can further be noted that the above description assumed that the first measurement is a static one. Again, the invention is not limited to this, and it would be possible for that first measurement to represent movement. If previous velocity information was available, earlier measurements may be provided by means other than use of system processing. Nevertheless, two measurements are needed to start the system, since even in the static case two measurements are needed to establish that the object is static.

By putting constraints on the system in this way, it overcomes the problem of over speed, and the system is now limited by a different constraint, e.g. over acceleration if the simplest system is implemented, or analogue bandwidth limitations.

The above discussion assumes a noise-free operation. This is not realisable in practice, but a development of the present invention enables some noise to be overcome. Any measurement may contain noise, and that noise may be sufficient to move a measurement from one segment to another.

Consider a single co-ordinate axis system that is slowly moving and consider the case where the constraint is that velocity can change by 0, and ±1. When this system jumps the boundary from one segment to the next, then velocity increment changes from 0 to +1. Now applying the velocity rule, the forbidden segment is the previous segment. Thus if the jump from one segment to the next was due to noise, then implementation of the new system would cause a measurement error flag to be set, whereas the traditional system would function normally, and no error flag would be set. Hence by introducing this idea, the new system needs to be made less susceptible to noise than the traditional system to produce equally good performance at low speeds in the presence of noise. This problem can be addressed in the higher resolution system or the system using two independent systems of axes. The following discusses the solution in the two axes system. Consider now the situation previously mentioned, where a measurement is in a segment corresponding to doubtful validity, and there has been a change in velocity in one co-ordinate system but not in the other. The simplest implementation of the idea is that provided the system produces a valid result in one measurement system then the result is valid. If the systems have a higher resolution, i.e. each quadrant is further divided into smaller segments then a more generalised acceptability criterion can be used. Definition of acceptable noise can then be obtained by considering whether the measurement point is closer to the segment boundary which would correspond to a valid measurement, or closer to the segment boundary which would result in the measurement being invalid in both co-ordinate systems. The former can then be assumed to be a valid measurement affected by noise, and the measurement treated as if it is in a valid segment, whereas the latter can be treated as an invalid measurement. This can be generalised by dividing the angular separation (normally 45°) of adjacent axes from the two co-ordinate systems into two parts of angular width X and Y with measurements within angular width X considered valid and measurements within angular width Y being considered invalid. The ratio of X and Y may then be varied to adjust the acceptable noise level. This ability to adjust what is treated as valid and what is treated as invalid will be referred to as 'soft error'.

As was mentioned previously, rather than analysing the two signals in quadrature on the basis of at least two independent systems of co-ordinate axes, it is also possible within the present invention to analyse them on the basis of a high resolution co-ordinate axes system. That co-ordinate axes system will need at least six axes preferably of uniform spacing, but more than six axes may be used, preferably 8 or 16 or higher powers of two. In such an arrangement, there is the constraint on the possible changes that may occur, such that the quantity under consideration may only change by a limited amount. Where high resolution co-ordinate six axes system is provided, constraint is then that the quantity under consideration may only change by ±2, ±1, or 0. This broader constraint is needed in order to prevent changes due to noise representing transitions across an axes, and back being treated as an error.

With this arrangement, it is also possible to make use of the soft error feature referred to previously.

Thus, in this way, the present invention may permit the detection of over speed in a situation where any individual measurement is affected by noise, and it is possible to allow for measurements which could represent over speed, or could represent measurements represented by noise. It is then possible to adjust the levels of acceptable noise/levels of invalidity acceptable.

When such an arrangement is supplied to an encoder or interferometer in which the detector is controlled by a clock which determines the detector sampling rate, the present invention is applicable to velocities up to that sampling rate.

Moreover, the present invention permits predictions to be made on the basis of previous measurements. The processing means referred to previously may then be arranged to derive a prediction of one of the successive values of the constellation states from at least two of the earlier values of constellation states, and to compare that prediction with the corresponding location of the constellation state as subsequently measured.

A third aspect of the invention provides an apparatus for determining movement, comprising: means for generating two signals of different phase in dependence on the relative position of two objects, the movement of said two objects producing corresponding changes in said two signals; a processor for processing said two signals, thereby to determine said movement whereby the means for processing is on the basis of locating successive values of constellation states of the two signals in a first co-ordinate axis system comprising an axis radiating from an origin, said processing means being arranged to monitor the change in said constellation states of the successive values by using at least a first and a second data samples which are obtained by sampling the two signals over time; wherein a second co-ordinate axis system comprising an axis radiating from an origin is provided whereby the second co-ordinate axis system is rotatable and prior to sampling the second data sample the second co-ordinate axis system is rotated relative to the first data sample such that the angular position of the first data sample with respect to the second co-ordinate axis system is known.

By having a rotatable co-ordinate axis system, a movable angular region of uncertainty as to the direction of travel can be defined for each reading rather than using the technique of counting the number of segments that have been traversed between the sampling of signals. The angular size of this region can be related to the characteristics of the apparatus being used.

The abovementioned ideas may be developed further into an adjustable filtering system with an adjustable centre frequency, and possibly bandwidth, of the bandpass filter which varies in dependence on values of the signals representing motion. Whilst this may involve the use of one or more co-ordinate axis systems as previously mentioned, other arrangements are also possible to derive a prediction of the signal value and hence this represents an independent aspect of the present invention.

In this fourth aspect, the present invention may provide an apparatus for determining movement, comprising:

means for generating at least two signals of different phase in dependence on the relative position of two objects, movement of said two objects causing corresponding changes in said at least two signals;

a processor for processing said at least two signals, thereby to determine said movement; and means for filtering over a frequency band which is narrow relative to the maximum bandwidth of said signals, said filtering means including means for varying the central frequency of said band over said maximum bandwidth, in dependence on a value derived from at least two data samples processed by said processing means.

The various aspects of the invention referred to above have all been defined in terms of an apparatus for determining movement. However, each of these aspects also includes a method of determining movement forming the processing steps carried out by the apparatus.

Embodiments of the invention will now be described in detail, by way of the example, with reference to the accompanying drawings, in which.

Figure 1:
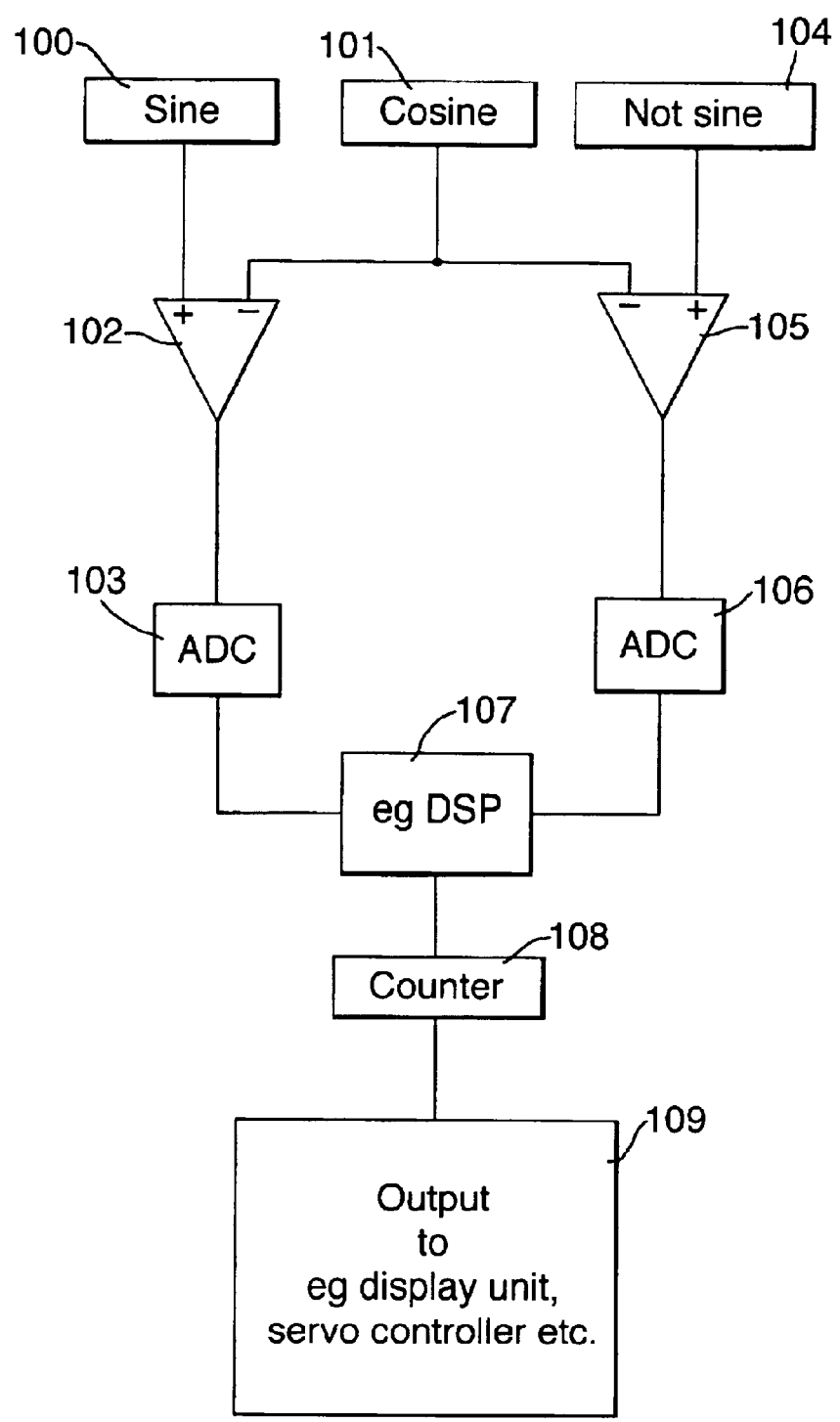
FIG. 1 shows an apparatus for processing signals from a detector of e.g. an interferometer or encoder system.

As has previously been mentioned, two sensors produce sine and cosine signals 100, 101 which are fed via a differential amplifier 102 to an analogue to digital converter 103. In practice, signals from encoder and interferometer systems may have a DC bias, and therefore a signal 104 corresponding to the inverse of the sine signal (not sine) is subtracted from the cosine signal 101 via a second differential amplifier 105. The output is then fed to a second analogue to digital converter 106, and the outputs of both analogue to digital converters 103, 106 are fed to a processor 107, such as a digital signal processor (DSP). If it could be shown that the sine and cosine signals 100, 101 were free of a DC component within acceptable tolerances, then these signals could be fed to amplifiers 102 and 105 respectively with out the need for signal subtraction. The processor 107 then carries out the analysis of the signals it receives. The single axes system is described first followed by the two axes system.

The processor 107 may include an accumulator, counter, or a separate counter 108 may be provided prior reaching to a suitable output device 109 such as a display unit or servo controller. If a servo controller is used, no separate counter is required as such a controller may have the quadrature signals themselves at inputs. It should be noted that the device thus described may be modified e.g. by use of a single analogue to digital converter which switches between the outputs of the amplifiers 102 and 105.

Figure 2:
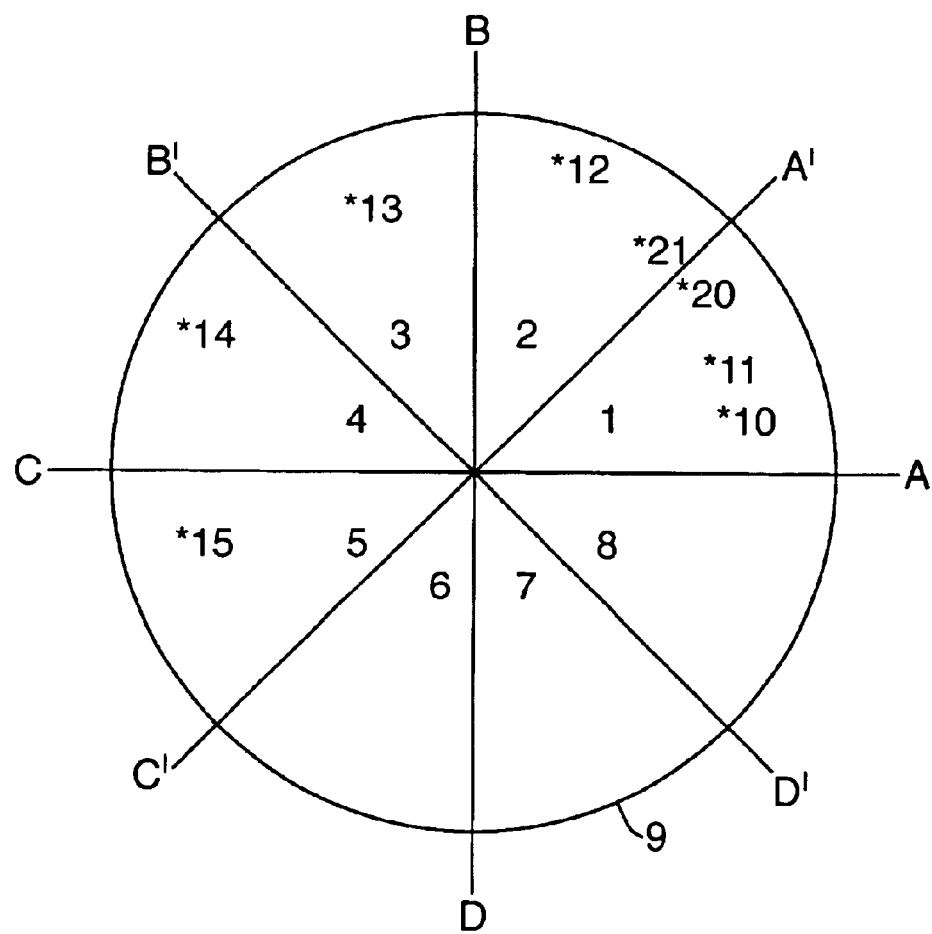
FIG. 2 is a schematic diagram illustrating the analysis of measurement points using a single axis system of eight axes.

Referring now to FIG. 2 which shows the outputs of two sensors producing sine and cosine outputs, measured against a single axes systems. FIG. 2 shows an axes system defined by axes A, B, C and D which are successively spaced at 90° about a common centre. Similarly, lines A', B', C' and D' are also spaced at 90° about that common centre, being spaced at 45° relative to axes A, B, C and D. These axes and lines define 8 segments and are labelled 1 to 8. This system can be thought of as a single axis system with eight axes. The constellation of states of the sine and cosine signals from amplifiers 105 and 106 are represented by the circle 9.

Suppose the first measured value is at point 10. That is in segment 1. If the second measured point is at point 11, then that point is within the same segment, and hence represents a "stationary" move, and hence is valid. If the third measured point is at point 12, within segment 2, then this represents a move from segment 1 to segment 2, and represents a valid move with velocity 1. If the third measured point was at point 13 as opposed to point 12, then this represents a move from segment 1 to segment 3, and represents a valid move with velocity 2. If the third measured point is at point 14, then this represents a move from segment 1 to segment 4, and represents a move with velocity 3. Depending on the system characteristics this could represent a valid move. If, however, the third measured point is at point 15 in segment 5, then this represents a move with velocity of either +4 or −4, which is ambiguous and hence the system would flag an over speed error. In traditional systems, increasing the resolution gives marginal benefit, because, in this example, if allowed moves with velocity of up to 3 are allowed then this increases the maximum allowed velocity by 50% before an over speed error condition would be flagged.

By applying the constraint to change in velocity as opposed to position removes the constraint from absolute velocity to change in velocity between clock samples. With the higher resolution systems applying a change in velocity of ±2 or ±3 at this level of interpolation solves two problems: maximum velocity constraint and the problem of small amounts of noise producing false move measurements causing erroneous over speed flags.

To illustrate the solution to the small amount of noise problem consider two measurements 20 and 21 in segments 1 and 2. Both these points lie close to the boundary line separating these two segments. Now assume that the points 20 and 21 represent four measurements taken in the sequence 20, 20, 21, 20. The first two measurements lie in the same segment and hence have a velocity of zero (or 8 or 16 etc). Then the third measurement to position 21 represents a change in velocity of +1, an allowed move. The fourth measurement now represents a change in position of −1, but a change in velocity of −2. Thus in traditional systems this would be an allowed move, positional changes of 0 and ±1 are allowed moves, but if the velocity change is constrained to 0 and ±1, then this would represent an invalid move. However, with the higher resolution systems which permit velocity changes of ±2 or higher than this now represents an allowed move. Thus at low velocities this solves the noise problem, and is referred to as an aliasing problem at high velocities (8, 16 etc in this system).

Whether the constraint of ±2 or ±3 is imposed depends on the characteristics of the system. A ±2 constraint makes the system more reliable in the detection of real over speed errors at the expense of reducing the maximum acceleration limit in the above example.

The problem with this approach is one of noise. If the change in velocity constraint is ±3, then this implies that the noise in the system needs to be significantly less than an octant to avoid false error flags. To overcome this problem with the same level of interpolation, the system can be considered as two separate systems of four segments each, with their axis rotated by 45°.

Figure 3:
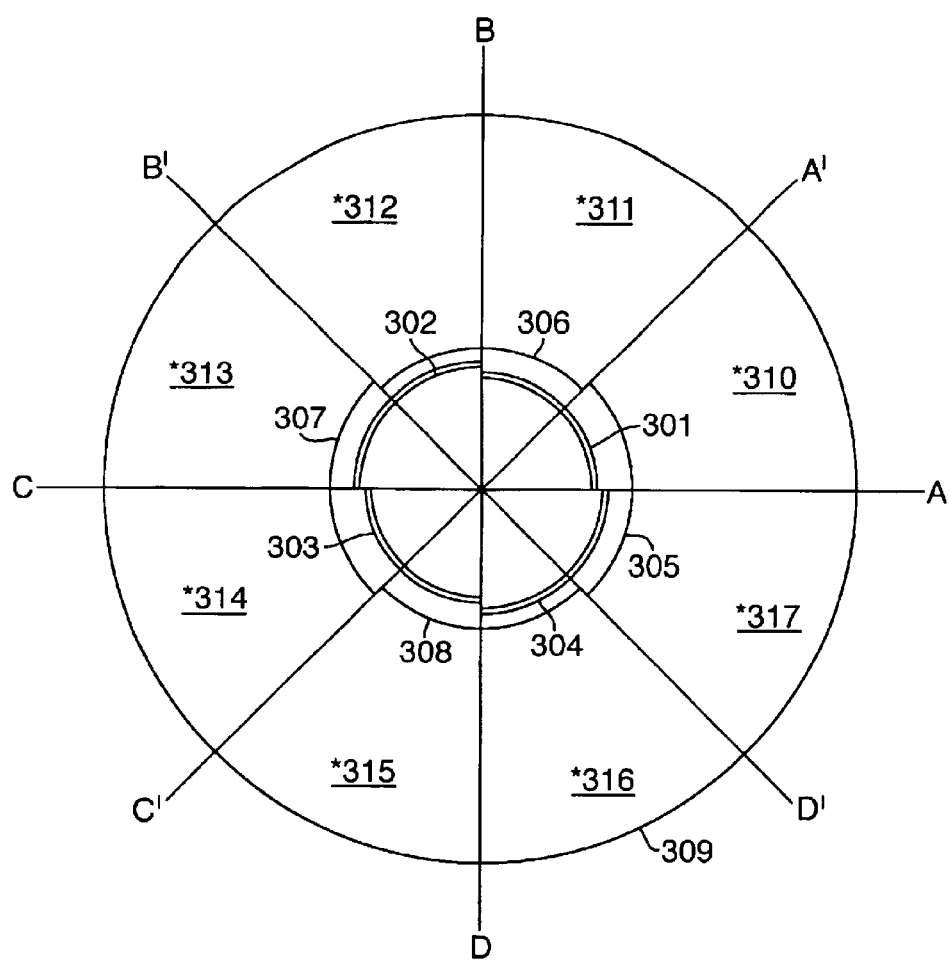
FIG. 3 is a schematic diagram illustrating the analysis of measurement points using two independent systems of co-ordinate axis which are rotationally displaced and have a common centre.

Referring now to FIG. 3 which shows the outputs of two sensors producing sine and cosine outputs, measured against two axes systems. FIG. 3 shows the first axes system defined by axis A, B, C and D which are successively spaced at 90° about a common centre. Similarly, axes A', B', C' and D' are also spaced at 90° about that common centre, being spaced by 45° relative to axes A, B, C and D. Under each axis system, four 90° segments are defined, with the axes A, B, C and D defining segments 301 to 304, and axes A', B', C' and D' defining segments 305 to 308. The constellation states of the sine and cosine signals from the amplifiers 102, 105 in FIG. 1 may be represented by circle 309. In the subsequent discussion, it is assumed that any valid change in measured value must lie in the same segment as, or in a segment which is adjacent to, the segment containing the first measured value.

Suppose the first measured value is at point 310. That is in segments 301 and 305 in the two axes systems. If the second measured point is at point 311, then that is still within segment 301 but represents a move from segment 305 to segment 306. Since changes of one segment are valid, this is a valid measurement. Similarly, if the second measured point is at point 312, then this represents a movement to segments 302 and 306 from segments 301 and 305, which again is valid. However, if the next measurement after point 310 is at point 313, then this is in segments 302 and 307. So far as the change between segments 301 and 302 is concerned, this is valid. However, the change from segments 305 to 307 is invalid, and thus this measurement is of doubtful validity. If the next measurement from measurement point 310 is at point 314, then this represents a movement to segments 303 and 307, which is invalid in both axes systems.

The process can be considered in the opposite direction for points 317, 316 and 315, and it can be appreciated that the measurement sequence 310, 311, 312, 313, 314, 315, 316, 317, 310 is valid, as is the sequence 310, 312, 314, 316, 310. Indeed, the sequence 310, 311, 313, 314, 316, 310 is also valid since the change from 311 to 313 represents a change to segments 302 and 307 from segments 301 and 306, and is therefore also a valid change.

Other variations may be defined by altering the variation possible, also depending on the quantities being measured.

At first sight, the difference between using two sets of axes, and using one set with smaller angles between the axes is similar. However, this does not take into account the issue of noise. Any measurement has uncertainty, as it may be subject to noise and other inaccuracies. Suppose that the first measurement point is at point 310, and the second is at point 313. If noise is a factor, the actual value may be displaced from that point and indeed could be on the opposite side of axis B', in which case it would be valid, or the opposite side of axis C, in which case it would be clearly invalid.

Suppose then that, when such a situation occurs, it is assumed that the measurement is valid, but has been subject to noise. The correct measurement should have been in segments 302 and 306. If the next measurement point is at point 314, movement has only been through one segment to segments 303 and 307, and is therefore valid. The doubtful measurement of point 314 can then be ignored. If, however, the next measurement is point 315, being in segments 303 and 308, and again there has been a two segment movement, and this is another invalid measurement. If, instead of detecting a fault on the first invalid measurement, the system continues to operate until two (or possibly more) consecutive invalid measurements have been obtained, then the effects of noise can be reduced.

Another possible use is to consider not merely the change in measurement point, but also the differential of the change. For example, suppose the measurement points represented displacement, and it was intended that the system should be operating under increasing velocity, so that velocity envisaged by a second measurement point should either stay the same, or increase or decrease by one step. Consider the first change from point 310 to point 314. This is a valid change, being a move to segments 302 and 306 from segments 301 and 305. It also represents a velocity change of +1 in each axis system assuming that the measurement of point 310 was taken at rest. For the next measurement, the velocity changes either ±1 or 0. The change must be the same on both axes systems. This means that a measurement of point 312 is valid (a velocity change from 1 to 0 in both axes systems), as is 314 (no velocity change in both axes systems) and point 316 (a velocity change of +1 in both axes systems). Other measurements are invalid.

However, if the next measurement point is at point 316, then the velocity is now at value 2, the next change must result in a velocity value of 1, 2 or 3 (plus ±1 or 0 change in measurement). Measurement points 316 and 317 are invalid (no change in one or both systems) and valid measurements are at point 310 (one change in both) 312 and 314. If it were at 314, representing an increase in velocity, then the next valid measurement points after that requires changes of 2, 3 or 4 segments, so now measurement points 310, 312 and 314 would again be valid.

Thus, by defining the validity in terms of variations in segments possible, and having two sets of axes, more information can be obtained than the known systems as to which measurements are valid and which are not.

It should be noted that the structure of FIG. 1 enables the processing of FIG. 3 to be carried out using digital electronics which has a loop update rate which can be slower than the response time of the analogue response time. To do this, the analogue to digital converters 103, 106 need to have a narrow sampling time compared to the clock sampling time. Then, when they sample the signals input from the amplifiers 102, 105, the part of the signal sampled represents only a small part of the analogue cycle. They thus provide useful sampling effects. If the sampling time is of the order of the period of the analogue cycle, then no useful results would be obtained in the arrangement of FIG. 1.

From FIG. 3, each measurement point moves from one quadrant to another, through four possible segments (quadrants) in each axis system. In the processing of this signal within the processor 107, this may be achieved by defining four pointers with successive values. Then, the constraint on the system of a change of ±1 or 0 represents a change from a pointer value to an adjacent pointer value, or remaining at the same pointer value. The value represented by the pointer may be velocity, etc as previously mentioned.

In the description above, the detection of over speed error has been done by comparing the current result with the previous result. An alternative, more desirable method, is to use the pointer system in a predictive mode. In this case one uses the pointer system to predict in which segment the next measurement should be, and the comparison is made between the actual segment and the predicted segment.

Prediction is straightforward since the previous value, and the constraints on the change of that value, mean that valid measurements only lie within a predetermined range. At its simplest, $V_n=V_{n-1}$ or $V_n=V_{n+1}$ then the permitted change is ±1. Since these have velocity values, they represent a history of three position values. Thus, by using the pointers, a history of changes can be established to derive a prediction of a subsequent value that is valid, and comparison with the measured value enables immediate validity/invalidity determinations.

Figure 4:
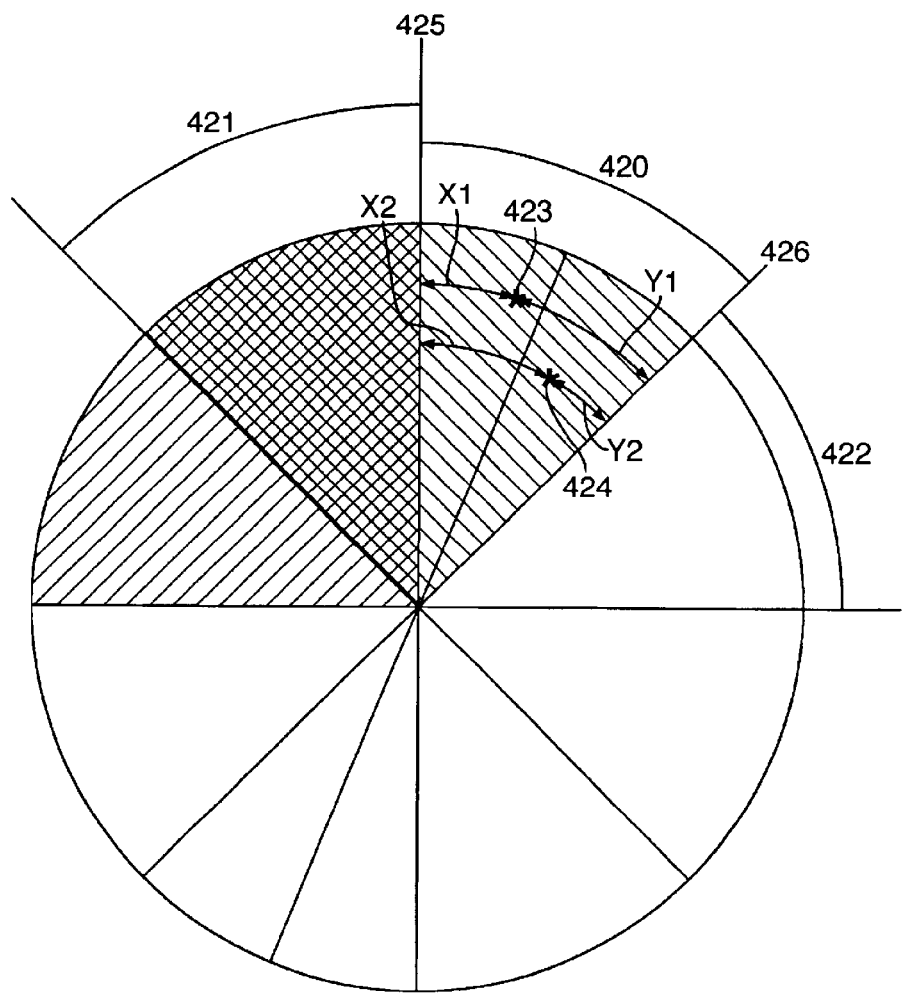
FIG. 4 is a further diagram showing the use of two independent systems of co-ordinate axis, to illustrate the soft error function.

It has previously been mentioned that the present invention can address the issue of noise in the measurement values, to permit acceptance of a value which would otherwise be rejected as invalid. This idea may be developed further as illustrated in FIG. 4. FIG. 4 is similar to FIG. 3, but this discussion concentrates on a 45° segment 420 which represents a doubtful measurement, in the sense that it represents a movement which is valid in one axis system and invalid in the other. That 45° segment 420 has, on either side of it, a 45° segment 421 which is valid in both axis systems, and a 45° segment 422 which represents an invalid measurement in both axis systems. Note that, in FIG. 4, it is assumed that the movement is counter-clockwise.

For processing purposes, consider two measurement points indicated by asterisks 423, 424. Measurement point 423 is separated by a distance X1 from the axis 425 separating segments 420 and 421, and separated by a distance Y1 from the axis 426 separating segments 420 and 422. Similarly, measurement point 424 is separated from axis 425 by distance X2 and is separated from axis 426 by distance Y2. Then, since X1 is less than Y1, measurement point 423 is closer to the valid segment 421 than the invalid segment 422 and so can be considered valid. Measurement point 424 is closer to the invalid segment 422, than the valid segment 421 and therefore may be considered invalid. This approach may be generalised so that if a measurement point is separated by angular distance X from the axes marking the boundary of the valid segment, and separated by angular distance Y from the boundary marking an invalid segment, then the decision as to whether to accept the measurement or not depends on the ratio of X to Y.

In the simplest case, if that ratio is less than 1, the measurement can be considered valid and if it is greater than 1 it can be considered invalid. However, other ratio values may be used, thereby varying the ratio of acceptable error as against rejection. The higher the permitted ratio, the more measurements are accepted as valid, and the less likelihood the system is to decide that failure has occurred. In processing movement, this means that it will take longer to determine that the movement has become unacceptable, but equally the system will not keep stopping for the influence of noise on valid movement. As the ratio of X to Y decreases, the system is less and less tolerant of error, but the system is more likely to produce rejection of measurements which were, in fact, valid.

The ratio can be chosen by the system designer, based on how much noise can be tolerated and how quickly a condition which corresponds to an error in the operation needs to be to detected. It should be noted that making use of this feature requires the analogue to digital convertors 103, 106 to define at least 16 different states, but in practice this is not a problem.

This use of adjustment of values of X and Y to vary what is considered an error, and what is not, is referred to as "soft error".

Figure 5:
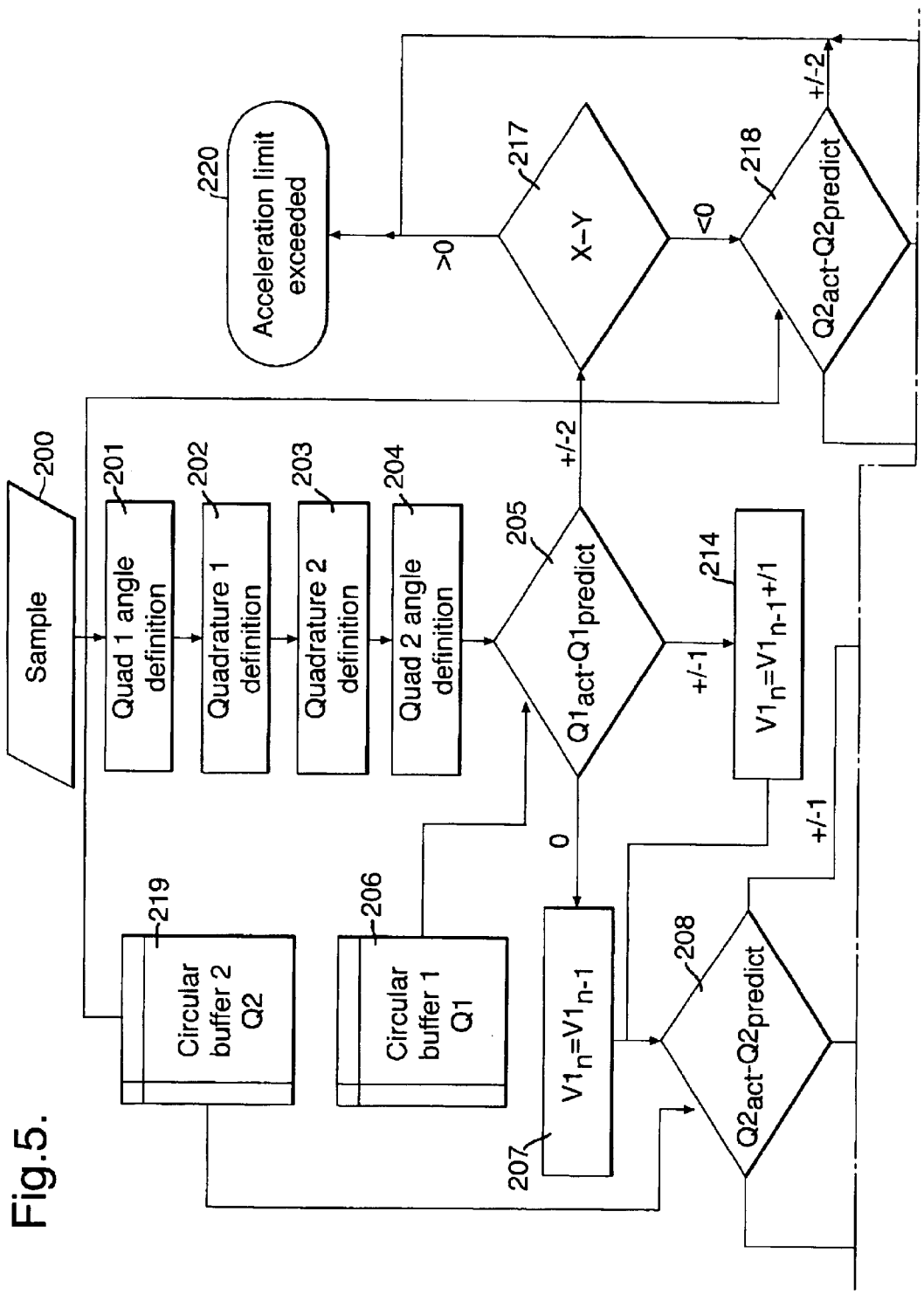
FIG. 5 is a block diagram showing the processing carried out in the arrangements of FIGS. 3 to 4.
Figure 5:
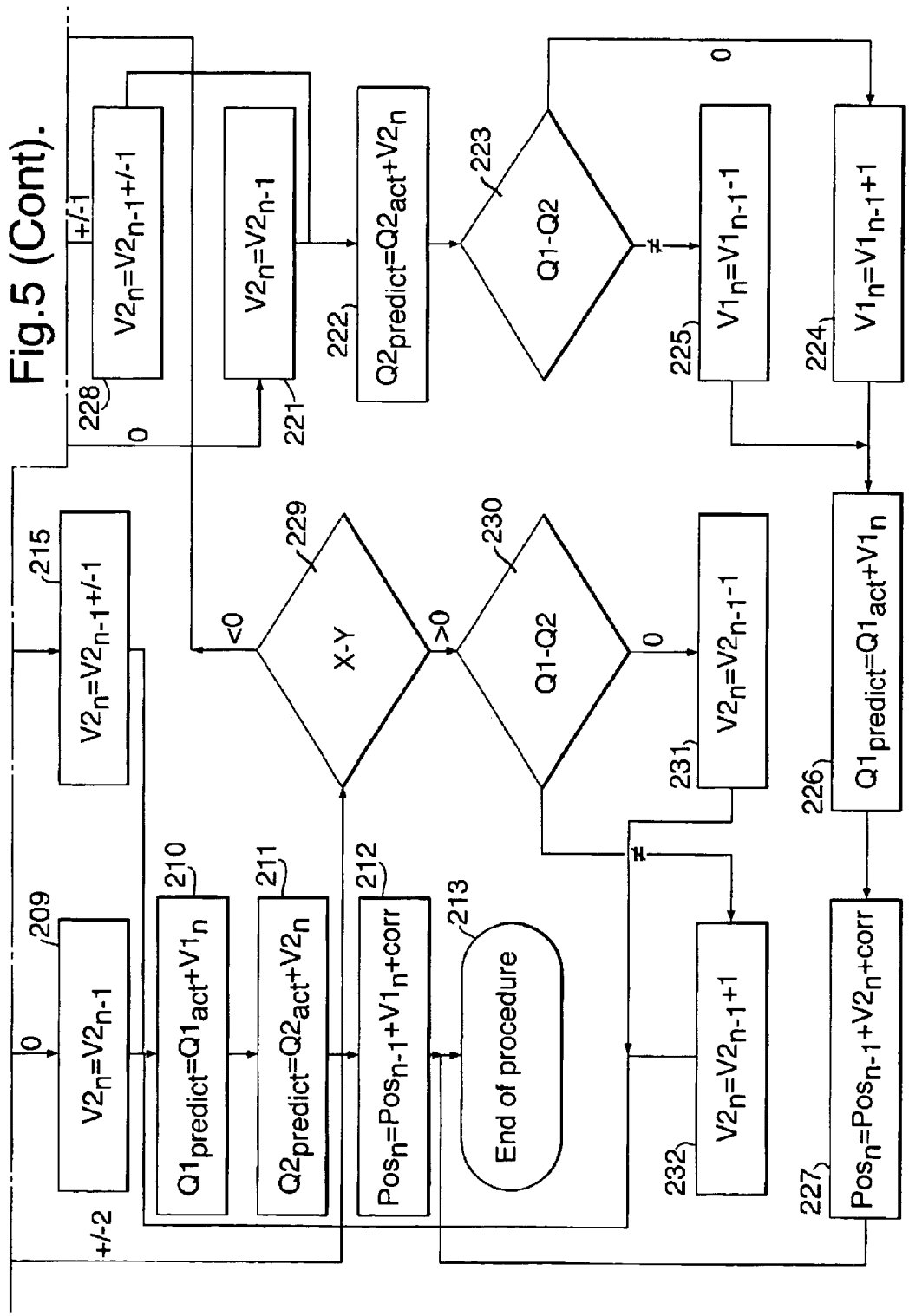

FIG. 5 is a block diagram illustrating the processing that has thus been described. In FIG. 5, it is assumed that the soft error decision is made when X and Y are equal.

Referring to FIG. 5, a sample value received at block 200 is first processed by blocks 201, 202, 203 and 204 to define the position of the sample in the two co-ordinate systems illustrated by FIG. 3. Having determined the position of the measurement point, the actual measurement in one axis system is compared at block 205 with the predicted value in that axis system derived from a buffer 206. The predicted value derived from the buffer 206 is derived on the basis of previous measurements as has previously been discussed. If the two are the same, then the velocity of the object is uniform and this is within the constraints of velocity changes of ±1 or 0 which have been set. Processing then moves via block 207 to block 208 in which the actions of block 205 are repeated in the second co-ordinate system. If again the change is 0, so there is uniform movement in both co-ordinate systems, processing moves via block 209 to blocks 210, 211 in which the predicted values are updated and the position of the object updated in block 212. The measurement procedure then ends for that sample at block 213, and the process is then repeated for the next sample.

Suppose now that, at block 205, it is found that the actual and predicted values differ by ±1. In that case, there has been a change in velocity, and this change is noted at block 214 before processing returns to block 208. If, at that block 208, there is no change the previous procedure repeats. If, on the other hand, there is a difference of ±1 processing moves via block 215 to blocks 210 to 213. Suppose now that, at block 205, the difference between the actual and predicted values are ±2. Processing then moves to block 217 which determines the soft error. If the soft error is within acceptable limits, processing moves to block 218 to perform the same function as block 208. It can be noted that blocks 208 and 218 derive their predicted values from a common buffer 219. If, on the other hand, block 218 identifies that the soft error is greater than the permitted limit, an error is identified at block 220. From block 218, there are again several possibilities, as for block 208. If the difference between the actual and predicted values is 0, processing moves via blocks 221 and 222, which correspond to blocks 209 and 211 to block 223 in which the values in the two co-ordinate systems are compared to enable the system to determine whether the change is positive or negative. Processing then moves via blocks 224 or 225 (one positive, one negative) to blocks 226 and 227, which correspond to blocks 210 and 212, and processing then ends at block 213. If, at block 218, the change between the actual and predicted value is ±1, then processing moves via block 228, rather than block 221, to block 222 and the subsequent process repeats. This is similar to the movement from block 208 via block 215 to block 210. The third possibility at block 218 is that the actual and predicted values differ by ±2. If this point has been reached, it will be appreciated that the change in values in both co-ordinate systems are greater than the permitted range, in which case this can be immediately identified as an error and processing moved to block 220. There is a further possibility. Suppose that the difference between the actual and predicted values of block 205 are within acceptable limits, and processing reaches block 208. It may then be found that the difference between the actual and predicted values and the second co-ordinate systems are ±2 i.e. outside the permitted values. Then, processing moves to block 229 which performs a similar soft error function to block 217. As with block 217, if the soft error is outside acceptable limits, processing immediately moves to block 220. If it is within acceptable limits (note that the sign of the values is now the opposite to that of block 217, processing moves to block 230 in which the same comparison is carried out as block 223 to derive new values at blocks 231 or 232 in a similar way to blocks 225 and 224. Processing then moves back to block 210.

Thus, if the actual and predicted values are acceptable in both co-ordinate systems, the buffers are updated, the values of position updated, and the measurement cycle ends. If either is outside the permitted limit, then soft error measurements are made. If either of those gives an unacceptable result, or if the actual and predicted values in both co-ordinate systems are unacceptable, then this is treated as an error. If one or other of the soft error functions gives an acceptable result, then it is assumed that the system has been effected by noise and processing continues.

Figure 6:
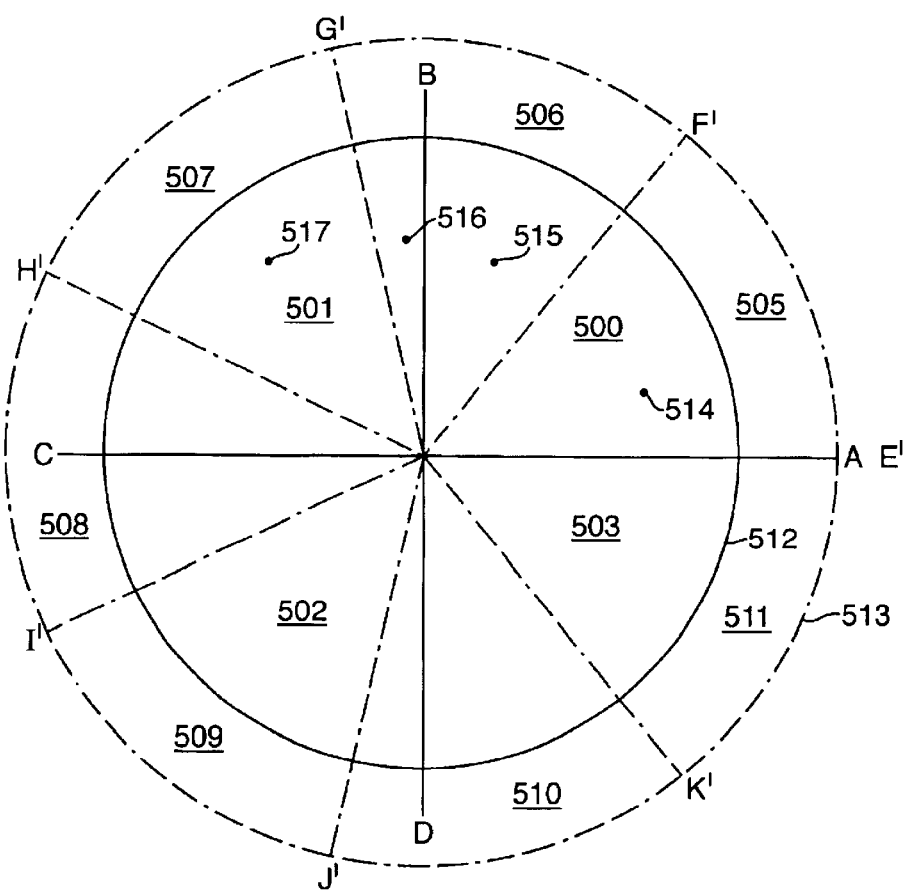
FIG. 6 is a schematic diagram illustrating the analysis of measurement points using two independent systems of co-ordinate axes with different numbers of axes in the two systems.

In the embodiments of FIGS. 3 to 5, the two co-ordinate axis systems have the same number of axes, with the axes of one system being rotationally displaced relative to the axes. However, it is not necessary that the co-ordinate axis systems have the same number of axes, and FIG. 6 illustrates an embodiment in which the co-ordinate axis systems have different numbers of axes. In FIG. 6, one system has four axes A, B, C and D which are successively displaced by 90° about a common centre, and thus are equivalent to one of the axis systems in FIG. 3. Thus, four 90° segments 500 to 503 are defined in which the constellation states of the sine and cosine signals are within. The second axis system is defined by axes E', F', G', H', I', J' and K' illustrated by dotted lines in FIG. 6, defining seven segments 501 to 511. Note that, for the sake of clarity, the periphery 512 of the segments 500 to 503 is shown spaced from the periphery 513 of segments 505 to 511, but this is not necessary in a practical embodiment. In this arrangement, the axes A and E' coincide, although again this is not essential.

The processing carried out using the two co-ordinate axis systems of FIG. 6 is similar to that described with a reference to FIGS. 3 to 5, and again it can be assumed that to any valid change in the measured value must lie in the same segment as, or in a segment which is adjacent to, the segment containing the first measured value. Thus, movement from point 514 in segments 500 and 505 to point 515 in segments 500 and 506 is valid, as is a change from point 514 to point 506 in segments 506 and 501. However, a movement from point 514 to point 517 is not valid because it represents a change of two segments in the second axis system. Other effects similar to FIGS. 1 or 3 may be applied in this situation.

The number of axes in the two axis systems can be freely chosen, and may have one or more axes in common, as in FIG. 6, or may have no axes in common.

Preferably, the number of axes in the two axis systems should not be multiples of each other, and more preferably the number should have no common factors. Suitable axis ratios include 4:7, 3:8, 5:8 and 7:8.

Figure 16:
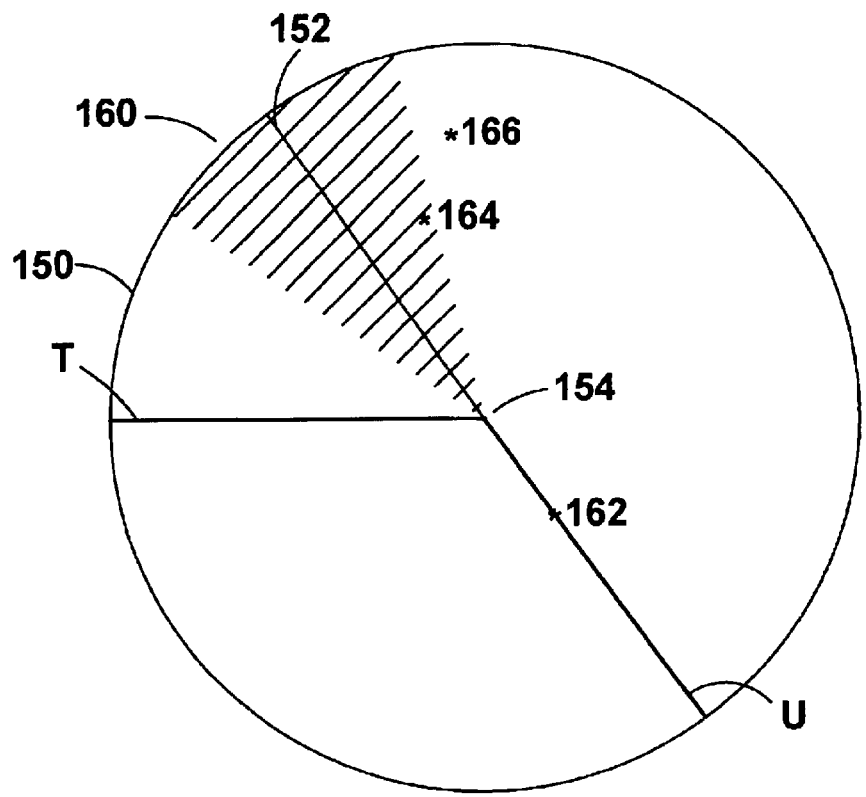
FIG. 16 is a schematic diagram illustrating the analysis of measurement points using a two axis system each system having one axis with displacement as the constraint.

FIG. 16 shows the outputs of two sensors producing sine and cosine outputs, measured against a two axis system. The outputs are represented by a circle 150. There is a first stationary axis system having an axis T and a second rotatable axis system having an axis U. A forbidden zone 160 is located in a region of the circle 150 which is centred on a line 152 that is the continuation of the axis U through the origin 154 of the circle.

When a first reading 162 is taken, the rotatable axis U is moved to align the first point 162 to the rotatable axis U (as shown in the Fig). The forbidden zone 160 is of sufficient angular width to prevent any valid readings being taken when there is uncertainty about the direction travelled. For example a second reading at 164 would not be a valid reading as it may be unknown (for example when the stationary axis T is located within the forbidden zone) whether we travelled in a clockwise or anti-clockwise direction to reach the point. A second reading at 166 is however valid as it could only have occurred by travelling in an anti-clockwise direction. This is because the size of the region of uncertainty (the forbidden zone) is determined by the noise of the system in addition to a safety region.

The axis T of the stationary system merely defines a count up or a count down in the relative distance moved by the two objects, depending on the direction, when the signal passes through the axis.

Figure 17:
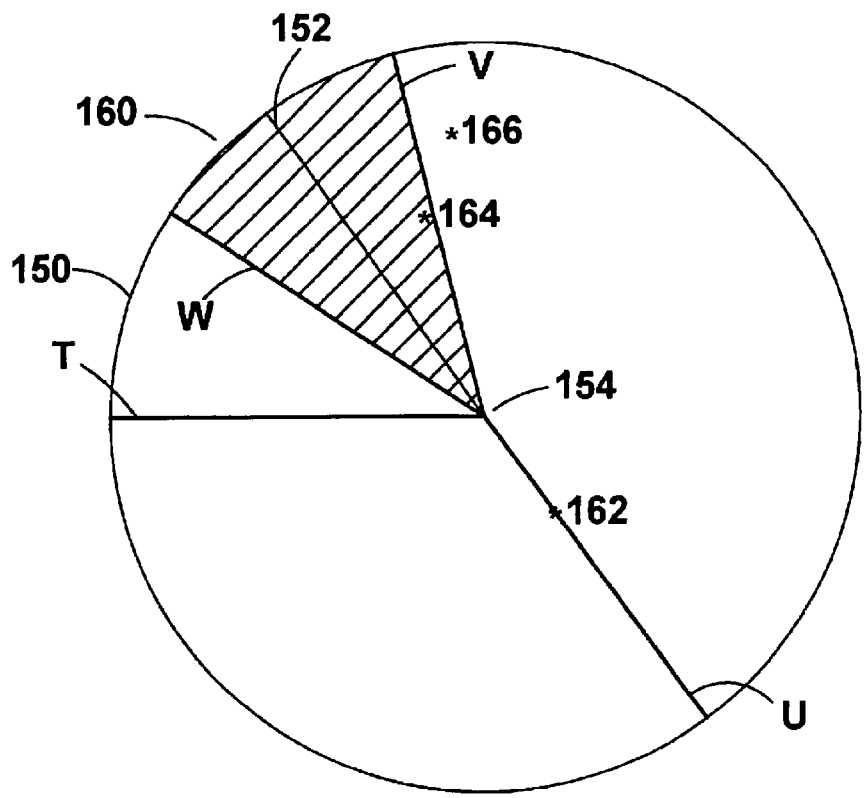
FIG. 17 is a schematic diagram illustrating the analysis of measurement points using a two axis system when the rotatable axis system has three axes.

In FIG. 17, the forbidden zone is defined by two further axes V and W which are arranged having a common origin with each other and axis U and are at least temporarily fixed in position with respect to U and each other. In this embodiment, the readings must always be aligned with axis U for two reasons, the angular separation between V and W defines the forbidden zone and is not necessarily equal to the angular separation UV and UW (which may also not be equal to each other), and secondly, because there is only one reference point on the stationary axis system (axis T).

Figure 18:
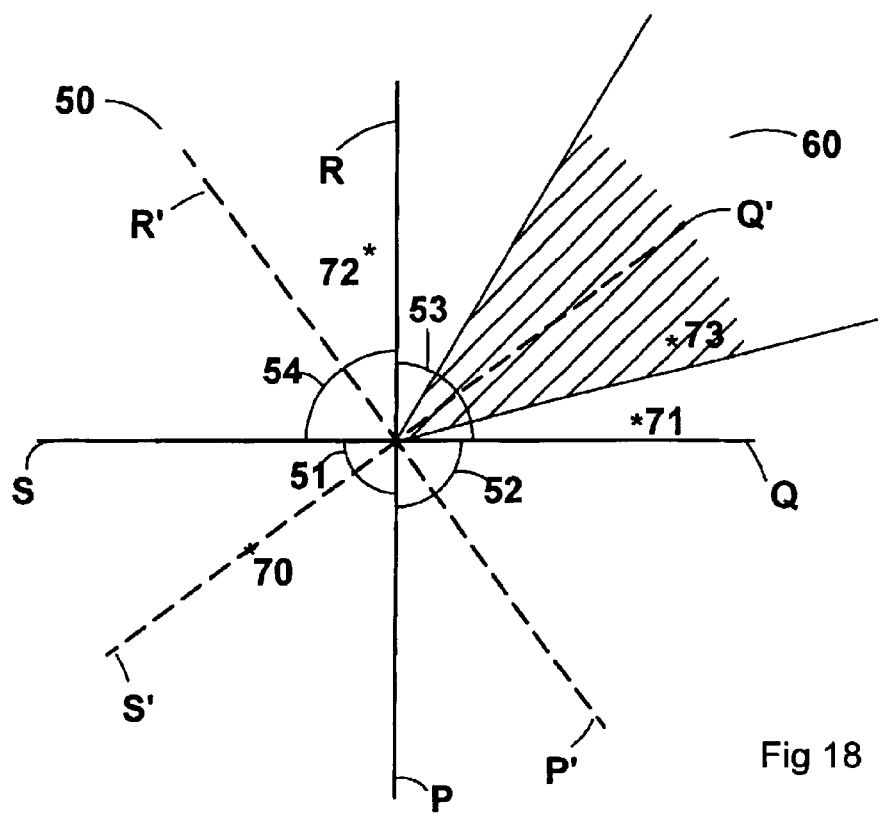
FIG. 18 is a schematic diagram illustrating the analysis of measurement points using a two axis system where one of the axis systems is rotatable where displacement is the constraint.

Referring now to FIG. 18 which shows the outputs of two sensors producing sine and cosine outputs, measured against a two axis system. FIG. 18 shows a first axis system defined by axes P, Q, R and S which are successively spaced at 90° about a common centre. These axes define 4 segments which are labelled 51 to 54. A second rotatable axis system 50 also has four axes P', Q', R' and S' which are successively spaced at 90° about the same common centre as the first axis system and defines four segments P'Q', Q'R', R'S', S'P'.

The constraint for this system is displacement. The first measured value is at point 70 and the system is considered as stationary at this starting point. The rotatable axis system 50 has been rotated so that point 70 is aligned with axis S'. In order to be confident in the next measured reading, it may occur at any point around the circle except zone 60 (shaded). In this narrow zone 60, there is uncertainty as to which direction (clockwise or anticlockwise) was travelled. Thus, a reading at points 71 and 72 are acceptable, but not at point 73 as there is uncertainty in how the system arrived there.

The invention thus allows, even when displacement is the constraint, movement through two segments (51 to 53 for reading 71) of the stationary axis system as long as the defined region or zone of uncertainty is not entered. This is because only the second rotatable set of axes determines whether the reading is acceptable or not. The first co-ordinate axis system counts up or down as motion occurs and provides the position of the data sample from the angular position of the reading.

When it has been determined that the next reading (point 71) is not within the region of uncertainty, the rotatable axes 50 are rotated such that one axis, for example Q', is aligned to that measurement. The forbidden zone is now a symmetrical zone about axis S'.

As there are four axes P,Q,R,S in the stationary axis system, there are four count positions per revolution so it is less critical in this example to have the same rotatable axis system aligned with the readings. Of course if the rotatable axis system of FIG. 17 were used in this example i.e. a three axis system, then as the size of the forbidden zone is determined by two of the axes, the same axis (U) would need to be aligned each time.

Thus, the region of uncertainty and the zone in which an error would be flagged may be symmetrically aligned about a line defined as passing through the co-ordinates of the first signal and the origin i.e. a continuation of the axis on the other side of the origin to the first signal. Where each co-ordinate axis system defines four segments i.e. four axes which intersect at the origin, this line is the axis having the opposite direction in the same plane as the aligned axis.

Alternatively, this four axis system could be considered as a two axis system having a central origin in which case the line would comprise the part of the aligned axis having the opposite sign (positive or negative) to the part of that axis to which the signal has been aligned.

When an uneven number of axes are used in a system and/or when the segment sizes are of differing sizes, the centre of the region of uncertainty will be found located around a continuation of the line drawn from the measured position through the origin. The forbidden zone need not be symmetrical and can be varied in size depending on current working conditions.

Figure 19:
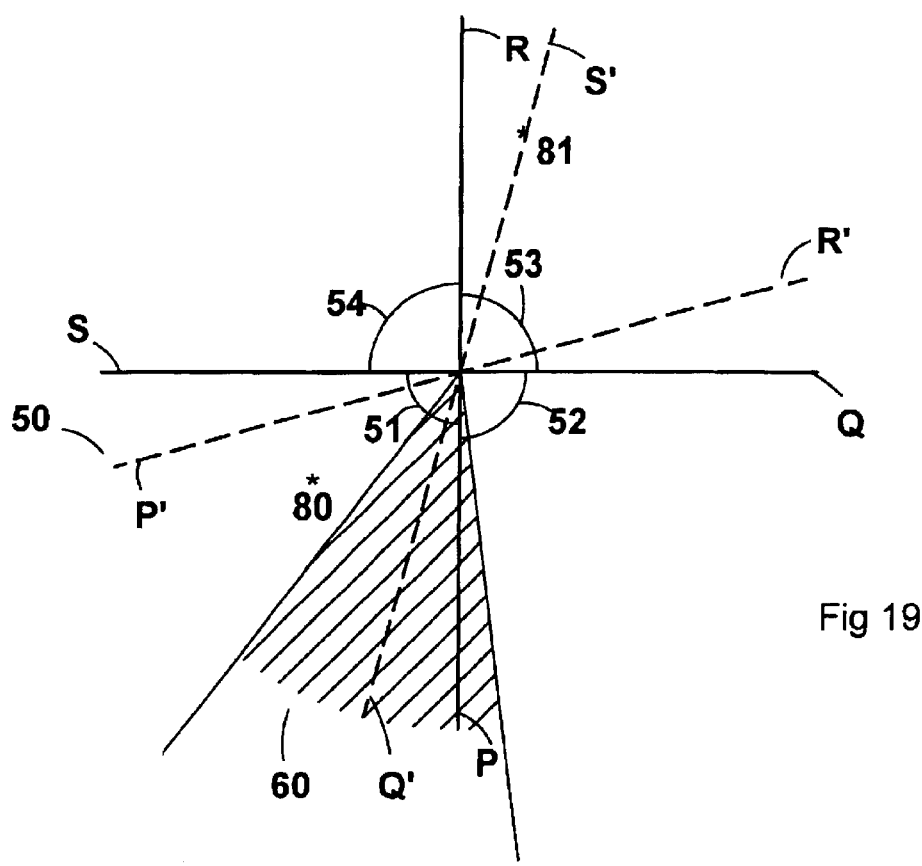
FIG. 19 is a schematic diagram illustrating the analysis of measurement points using a two axis system where one of the axis systems is rotatable where velocity is the constraint.

In FIG. 19, the same four segment system is used however in this case velocity is the constraint on the system. In order to enable fast relative motion between two moving parts, it is desirable to predict where the next measurement will occur i.e. what the signal outputs will be as this allows a comparison to be made between the actual and predicted rather than requiring time to process the difference between the successive positions to determine allowability i.e. whether an error has occurred.

For prediction, at least two previous measurements are necessary to predict the next reading. In this case, as a displacement is the constraint, two previous measurements are required. If reading two is at 80, within segment 51 and the processor predicts, based on readings one and two that at the next measurement the position will occur at point 81, which is in segment 54 and the direction of travel is known (from the previous readings) to be anti-clockwise, then under known systems, this would not be allowed (as the difference is −2). However, when predictions are made using a rotatable set of axes, the situation changes. In this case, the forbidden zone 60 is associated with the predicted location 81 not the current location 80 i.e. the region of uncertainty or forbidden zone is determined by the predicted position of the next measurement. Thus, the processor extrapolates the likely signal position when the next sample will be taken and the rotatable axes are rotated so that their alignment with the predicted position is known. As long as the next measured value does not lie within forbidden zone 60 which is located on axis Q' as this axis is found 180° round the circle from S' which is where the prediction 81 is located, the measured value will be accepted as a valid reading. If the measurement occurs in the forbidden zone then a error results. If the measurement does not occur in the forbidden zone then it is a valid measurement and the rotatable axes are rotated so that their alignment is known with respect to the next predicted position. If, however, the measured value lies within the forbidden zone 60, then a change in velocity either positive of negative that is not allowed has occurred. This is because the predicted value is based on the recent trend in velocity of the relative motion of the system. Thus the forbidden zone defines the region in which either the motion has slowed down too quickly or has speeded up at too fast a rate to be allowed.

To predict the location of the next reading, it is initially assumed that velocity is constant then the difference between the previous two phase angle positions (a value for the velocity) is added to the last reading to provide a predicted location for the next reading. Due to noise and fact that the velocity may vary to some degree without affecting the validity of the next reading, the predicted location may lie within an range of phase angles without the next reading being invalid. The remaining phase angles are situated within the forbidden zone.

The prediction can be offset from the calculated location by an angle in order to take into account external factors such as friction within the system otherwise, over time, the location of the next reading may drift towards the forbidden zone.

If the constraint on the system were velocity, then the same principle applies for predicting the next location except that when the calculation is made, it is assumed that acceleration is constant for the time intervals between the two previous readings and the next reading is made. Likewise for situations in which acceleration is the constraint, it is jerk that is assumed constant. For this situation three prior readings are required. Thus, the prediction is derived on the basis of a predetermined constraint on permitted variations in the successive values.

For systems where displacement and velocity are the constraint, three (or more) previous readings may be used in this case, the velocity or acceleration value is an average of two (or more) previous sampling intervals.

Although the rotatable co-ordinate axis system has been described thus far as being rotated such that the first signal is substantially axially aligned to one of the axis of the rotatable axis system, the rotatable co-ordinate axis system may alternatively be rotated such that first signal is substantially central to one of the segments of that co-ordinate axis system.

In this alternate case, the region of uncertainty and thus the zone in which an error would be flagged may be symmetrically aligned about a region located diagonally opposite that where the signal were located in the circle. Where each co-ordinate axis system defines four segments, this region would be centrally located in the opposite segment.

The distance that can be moved in each direction prior to an error signal being obtained is therefore approximately equalised thus reducing the likelihood of an error signal and enabling an increase in the displacement that is allowed between signal samples being taken. This is because the region of uncertainty is aligned to the signal rather than being calculated based on stationary axis systems.

The problem of noise, which was mitigated by other aspects of the invention is, with the application of the third aspect, further reduced. This is because the location of the last measurement compared to the current measurement is no longer constrained by the use of fixed axes. The use of one set of fixed axes to determine absolute position and thus provide the counting feature and one set of rotatable axes to provide the limits and thus define where a valid reading occurs means that as well as the zone of uncertainty being narrowed the possibility of a wrongly determined error is also reduced.

In all the examples described, the two co-ordinate axis systems have shared a common origin. This is convenient as it ensures overlap between the two systems throughout the angular range of the systems, but is not essential.

It has already been mentioned that the present invention permits values of e.g. velocity or acceleration to be predicted and compared with the measured values, since that speeds up processing. In a development of this idea, the prediction of the value, and hence the parameter of the signal to which that value corresponds, can be used for improved filtering of the signal itself. In principle, the value may vary over a very wide range. However, since there are constraints on the change in value, knowledge of previous values of the signal enable subsequent values to be predicted, and hence filtering can be carried out only around the predicted value. In such circumstances, the filter can have a much narrower bandwidth, but the centre frequency of that bandwidth has to change as the predicted value changes from one value to the next. Thus, an adjustable filter is produced which filters around a centre value which is itself determined by previous values of the signal being filtered. Although it is preferable, that the previous values are used to derive a prediction which is then used to determine the centre frequency of the filter, it is also possible to use e.g. the last measured values directly.

Figure 7:
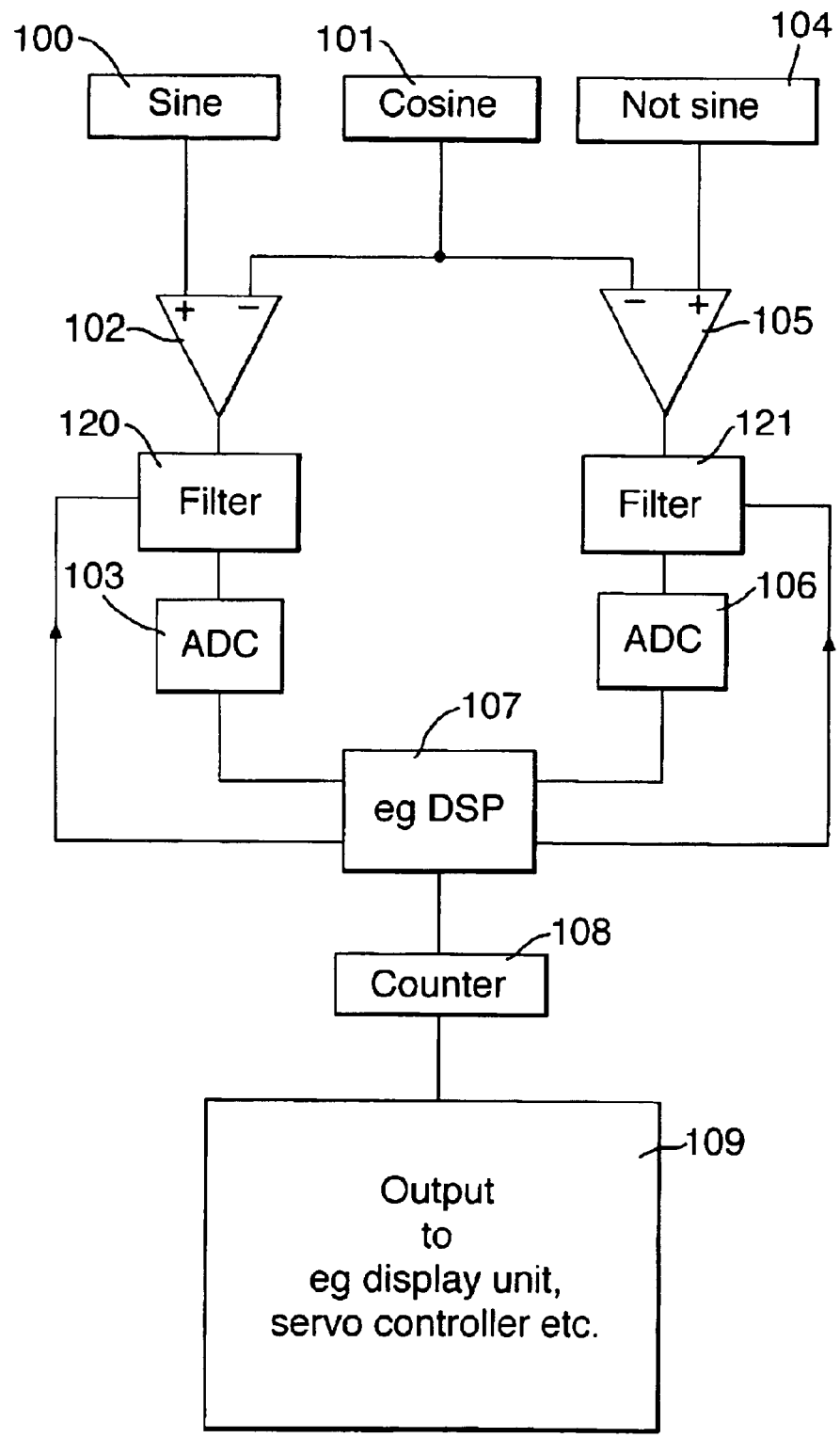
FIG. 7 shows an apparatus for processor signals from a detector of e.g. an interferometer encoder system similar to that of FIG. 1, but incorporating adaptive filters.

An embodiment incorporating such adjustable filtering is illustrated in FIG. 7. FIG. 7 is similar to FIG. 1, and the same reference numerals are used to indicate corresponding parts. FIG. 7 differs from FIG. 1 in that it requires filters 120, 121 between the differential amplifiers 102, 105 and the analogue to digital converters 103, 106. These filters 120, 121 are controlled by the processor 107 so that their frequency band changes in dependence on the predicted values of the signals from the amplifiers 102, 105. In this way, spurious frequency components can be removed without compromising the accuracy of the apparatus. The derivation of predicted values can most clearly be seen from FIG. 5, which shows blocks 231 and 232. Those predicted values are then velocity measurements on which the signals can be filtered.

This arrangement may further be developed by arranging for the bandwidth of the filter to vary with e.g. measurements of acceleration derived by the processor 107. Whilst a narrow bandwidth is desirable to exclude noise, the range of possible values increases with acceleration. Therefore, it is possible to adjust the bandwidth of the filter so that it is small when the acceleration is small, and increases with increasing acceleration.

Figure 8:
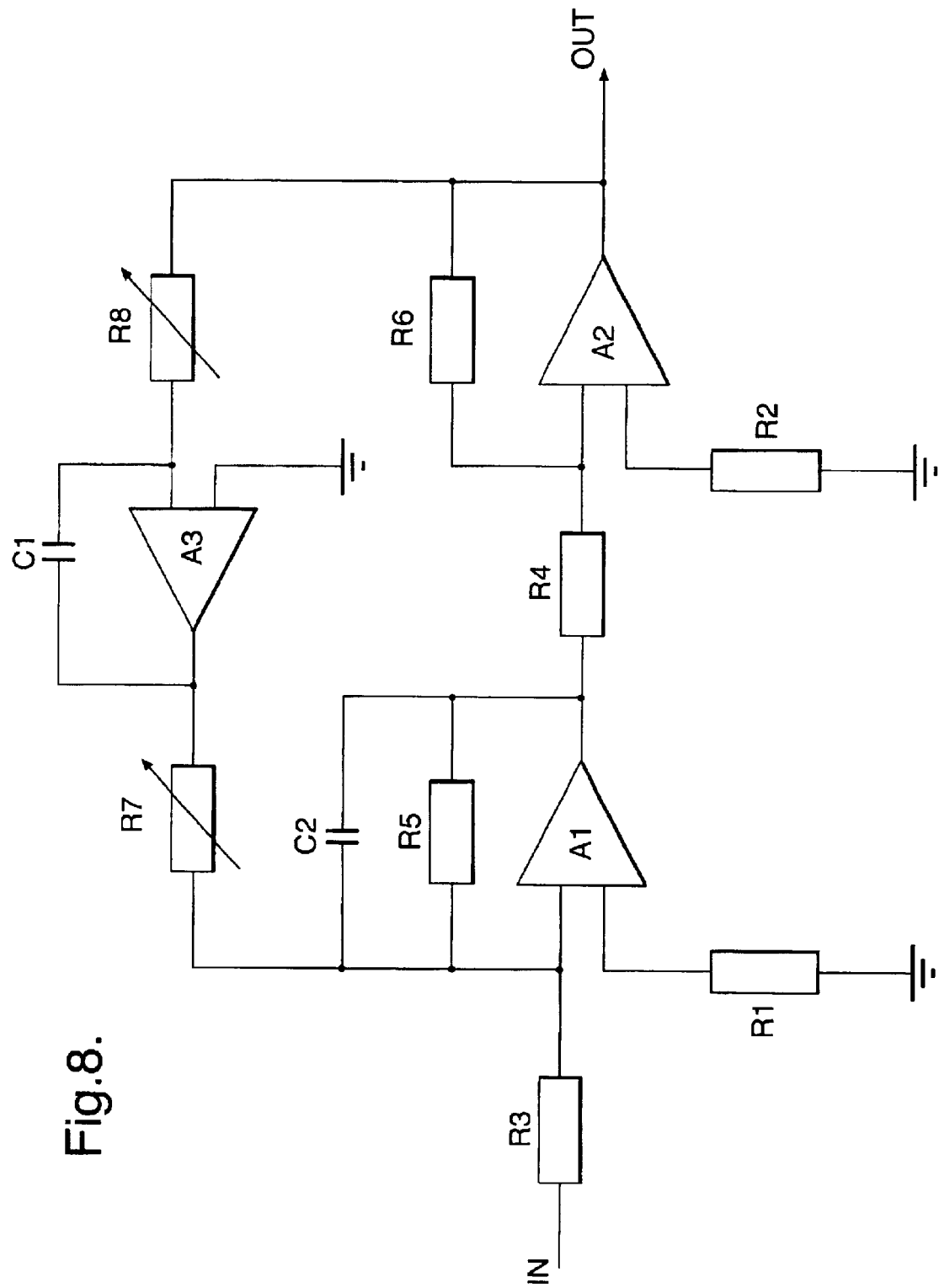
FIG. 8 illustrates a filter which may be used in the apparatus of FIG. 7.

The filters 120, 121 in FIG. 7 can be implemented in several ways, and one possible implementation is illustrated in FIG. 8, with a circuit corresponding to that of FIG. 8 forming the differential amplifier 102 and the filter 120, and the differential amplifier 105 and the filter 121. Resistors R7 and R8 are adjustable under the control of the processor 107, but have the same resistance Rf. Resistor R5 has resistance Rb, and capacitors C1 and C2 have capacitance Cf and Cb respectively. The band width of the filter thus formed is given by $$\frac{1}{2\pi}RbCb$$

and its central frequency is given by $$\frac{1}{2\pi}RfCf.$$

The value of resistance Rf is thus made proportional to the velocity prediction derived by the system, and that can be changed by the processor 107 from value to value by varying Rf.

Control of the resistors R7 and R8 under control of the processor may be achieved by using a resistor with electronically selectable taps with a built in up/down counter. By selecting the resistors to altered via an address line from the processor 107, any by counting up or down, a series of pulses can sent to the electronically selectable taps to either count up or count down depending on the status of the signals. In this way, the resistance of the resistors R7 and R8 can be adjusted. For example, Dallas semiconductor electronically controlled resistor DS1084 may be used having 100 selectable different resistance values. If it is desirable to make the bandwidth of the circuit dependant on the acceleration rate, resistor R5 may also be made variable under control of the processor 107, to vary Rb. In FIG. 7, the filters 120, 121 are between the differential amplifiers 102, 105 and the analogue to digital converters 103, 106. It would alternatively be possible for there to be filters in the input lines to the differential amplifiers 102, 105 on the sine, cosine and not sine input 100, 101, 104.

In practice, the velocity prediction is affected by the fact that block 205 acts separately on measurements from each axis system. Therefore, the predictions derived from each axis system may vary slightly. In this case, it is desirable to filter signals corresponding to each axis system separately. The result is that two arrangements similar to FIG. 7 are needed, receiving the same input signals but filtering in dependence on the velocity measurements on the respective two co-ordinate axis systems. This is illustrated in FIG. 9.

Figure 9:
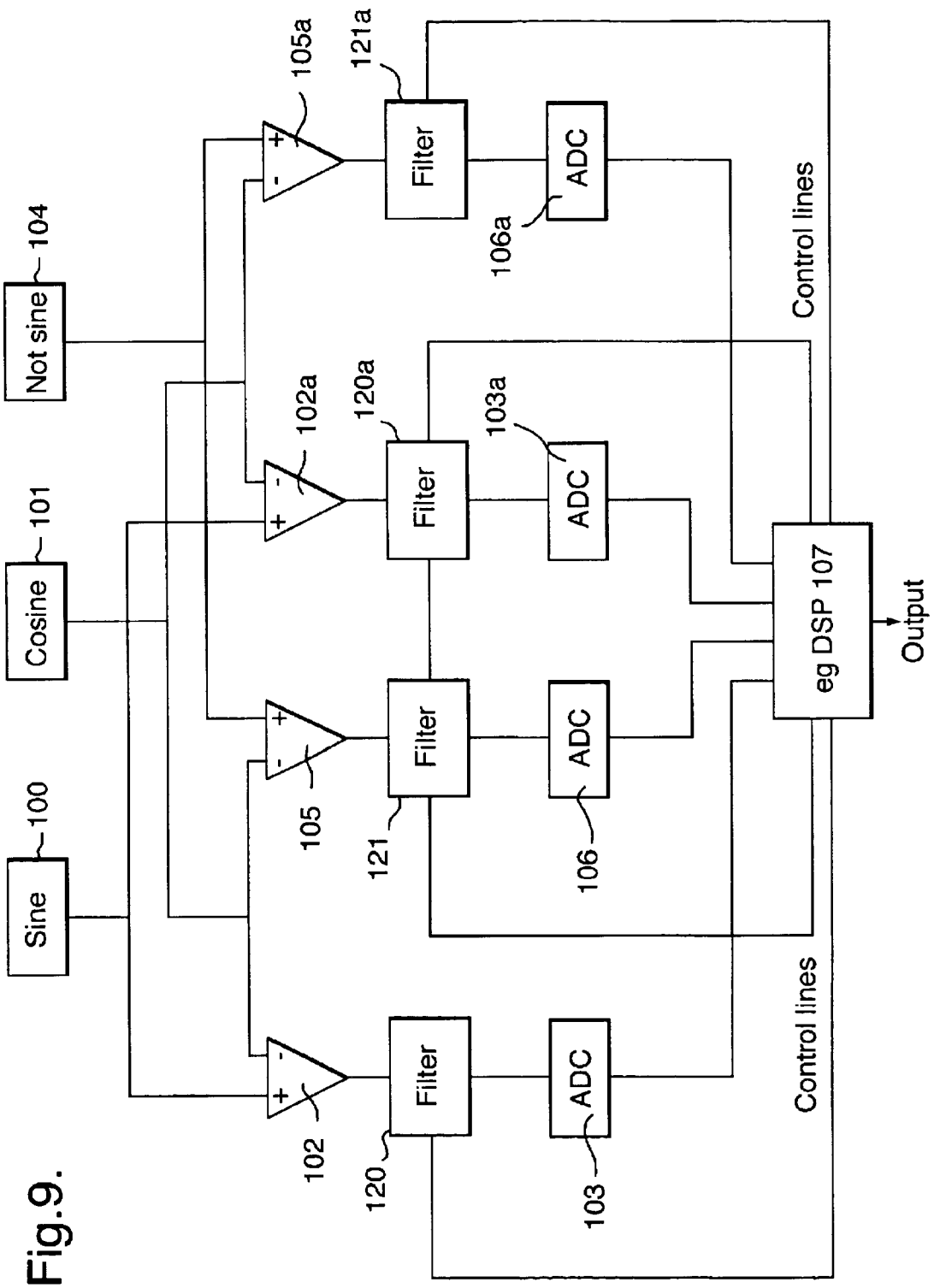
FIG. 9 illustrates a modification of the apparatus in FIG. 7, making use of multiple velocity predictions.

In FIG. 9, the arrangement of FIG. 7 is indicated by the same reference numerals, and a second arrangement of the same construction is illustrated by the same reference numerals but with the letter "a" added. The processor then controls the filters 120, 121 in dependence on velocity measurement derived from one axis system, and controls filter 120a 121a independence on a velocity measurement derived from the other axis system. The processor 107 then analyses the two results to derive a suitable composite measurement. The output of the processor 107 may then be sent to the counter 108 and the output 109 in FIG. 3, although this is not is not illustrated in FIG. 9.

Figure 10:
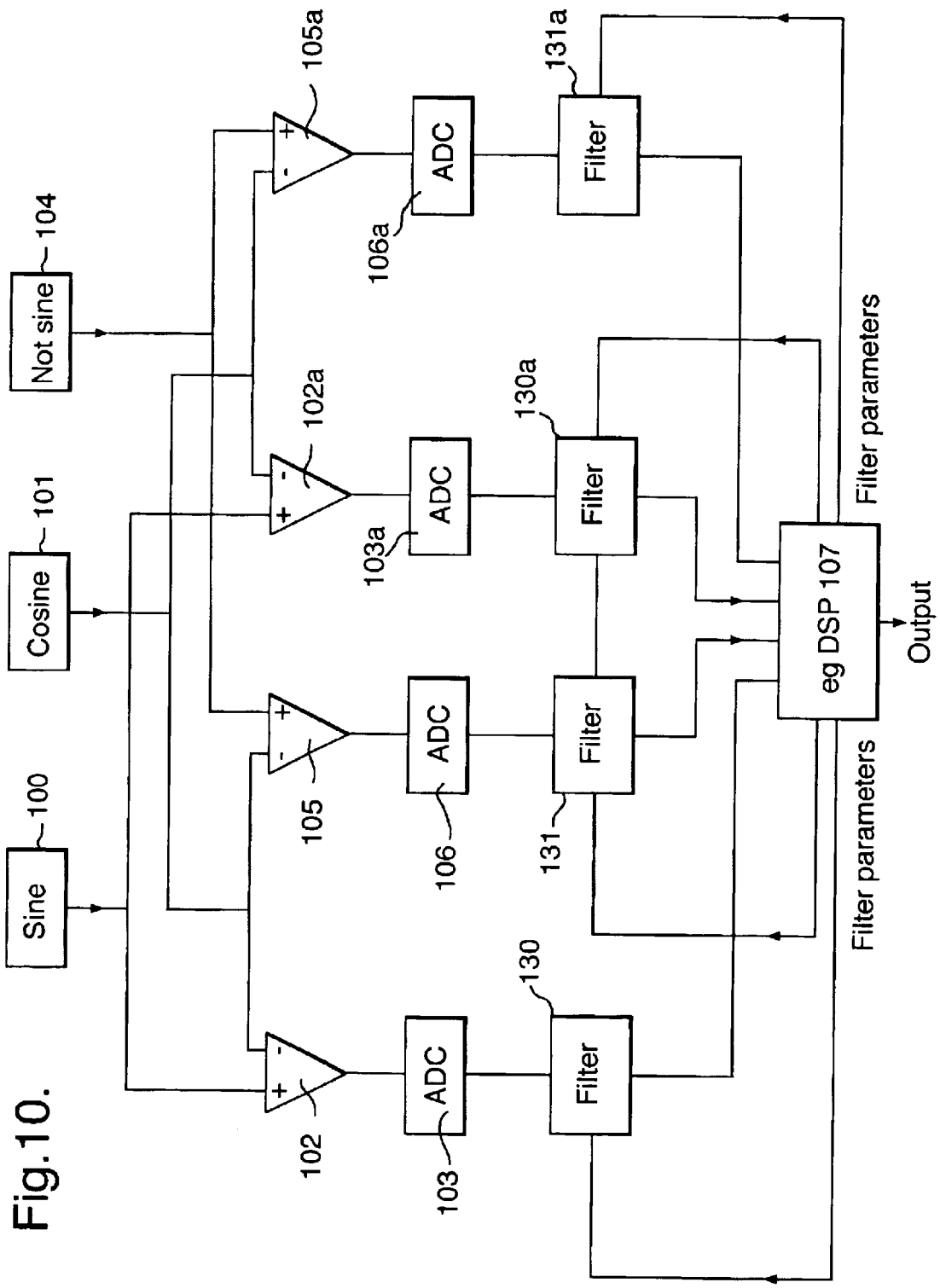
FIG. 10 is a modification of the apparatus of FIG. 9, in which the filtering is digital.

The arrangements of FIGS. 7 and 9 use analogue filtering. A further possibility is to use digital filtering, and an arrangement similar to FIG. 9, but making use of digital filtering is shown in FIG. 10. FIG. 10 is similar to FIG. 9 and same reference numerals are used to indicate corresponding parts. However, in FIG. 10, filters 130, 131, 130a and 131a are provided between the analogue to digital converters 103, 106, 103a and 106a and the processor 107. The parameters for those digital filters 130, 131, 130a and 131a are provided from the processor 107.

Digital filtering is known, in itself, and a structure of digital filters which may be used in the present invention is illustrated in e.g. the textbook entitled "Digital Signal Processing Application with Motorola's DSP56002 Processor" by Mohammed El-Sharkawy published by Prentice Hall in 1996, particularly pages 158 to 165. In the design of such a digital filter, the frequency term is made directly related to velocity.

Figure 11:
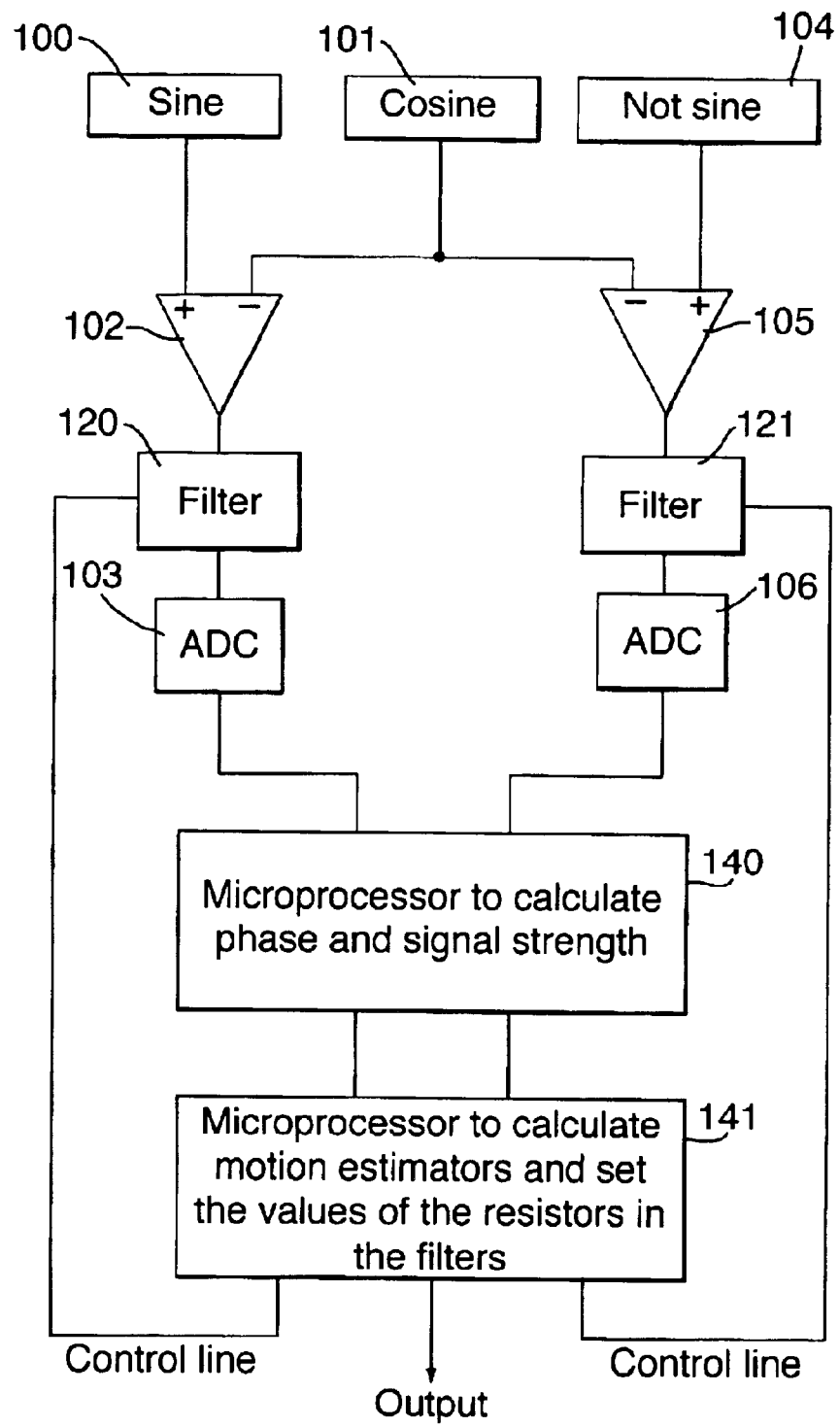
FIG. 11 is another embodiment of an apparatus for processing signals from a detector of e.g. an interferometer or encoding system, making use of adaptive filters but without using co-ordinate axis systems.

In the arrangement of FIGS. 7 to 10, the control of the filter is determined by a prediction derived from analysis using one or more co-ordinate axis systems, as in FIGS. 1 to 6. It is also possible to apply such adjustable filtering to arrangements which do not depend on control using co-ordinate axis systems. Such an embodiment is illustrated in FIG. 11. Components which correspond to components in FIG. 7 are indicated by the same reference numerals.

In this embodiment three signals are derived from the encoder or interferometer system. To remove the DC bias from the signals, the cosine signal is subtracted from the sine and not sine signals to produce two new sine and cosine signals. After the wide band analogue amplifier circuits 102, 105 do the subtraction, tuneable narrow band pass programmable filter circuits corresponding to those of FIG. 8 are added as shown in FIG. 11. In the filter of FIG. 8 the variable resistors R7 and R8 are set to be approximately equal to Rf and C1 so that the centre bandpass frequency is $$\frac{1}{2\pi} RfCf,$$

where this frequency is the predicted frequency of the input sinusoidal signals. This predicted frequency is directionally proportional to the predicted velocity of the target. The bandwidth of the passband of the bandpass filter is given by $$\frac{1}{2\pi} RbCb$$

where Rb is R5, and Cb is C2. The bandwidth of the bandpass filter may also be varied by changing the values of R5 and if necessary C2.

The output from these two electronically adjustable narrow bandwidth amplifiers are passed to separate clocked analogue to digital converters 103 and 105. The clock signal used for controlling this conversion can be derived from a master clock. The digital outputs are then passed to for example a microprocessor circuit that computes the phase and signal strength of these two signals. The phase is computed by calculating ArcTan $$\mathrm{ArcTan}\left[\frac{\mathrm{Sine}}{\mathrm{Cosine}}\right]$$

where the sine signal is the output of converter 103 and the cosine signal is the output of converter 106. The signal strength is derived from $\sqrt{\mathrm{Sine}^2 + \mathrm{Cosine}^2}$. In this arrangement it is preferable that these calculations are completed on or before the next digitally converted signals become available. The computed phase is then passed on within the same microprocessor, 140 or to a separate microprocessor, 141 to calculate the current and predicted positions and velocities of the machine. There may be several required predicted positions and velocities. For example, the predicted velocity required for controlling the bandwidth and bandpass frequency of the differential amplifier circuits may be different to the predicted velocity required by the machine controllers. In this example the time delay between the signals arriving at the analogue to digital converters and obtaining the predicted velocity is three clock cycles, whereas the time delay on when the controller can use the predicted velocities could be considerably longer.

The predicted velocity can be calculated in the following manner. Since in this example the time delay in the system is two clock cycles, one takes the current calculated position and subtract the position calculated from two lock cycles ago and compute the average velocity, and this is used as the predicted output velocity, and the bandpass of the filters is set accordingly. A refined method is to look at the change in velocity over this period, and assume for the next clock cycle the change in velocity will be the same, and amend the predicted velocity accordingly. For example let the three calculated positions be e, f and g. Then the velocities are v1=f−e, and v2=g−f, and the acceleration, a, is a a=v2−v1. The refined predicted velocity would be v2+a for setting the bandpass frequency for the analogue subtraction circuit.

The advantage of this approach is that the system predicts the bandpass frequency of the subtraction amplifiers, and limits the bandwidth of this circuit to the expected variation in frequency due to the uncertainty in predicting the velocity. This then allows for a reduction in the noise of the system by a factor of approximately three for every decade in reduction in bandwidth. For example, assume that the circuit would require a bandwidth of DC to 10 MHz, using standard electronics, but by adopting the above approach the bandwidth of the circuit could be reduced to 1 kHz, then this would imply a factor of 100 improvement in the signal to noise ratio due to the electronics. For a standard linear HeNe interferometer system with a scale pitch of approximately 0.03 microns a bandwidth limitation of 1 kHz, implies an uncertainty in the velocity of the system of 0.3 mm s$^{-1}$.

Figure 12:
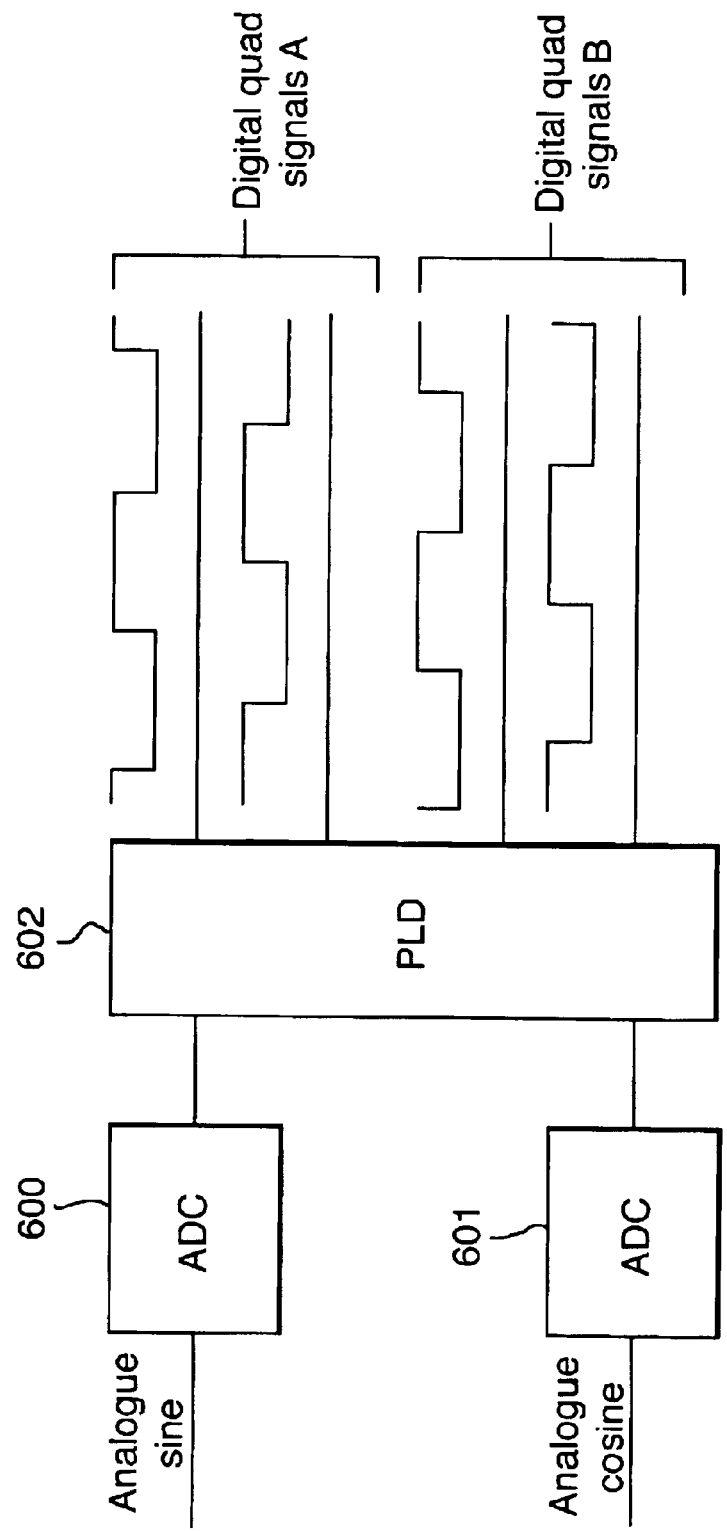
FIG. 12 is a schematic block diagram showing digital quad signals.

Although the system above has been described using analogue sine and cosine signals, it can be used with digital A quad B signals. To use the concept on digital quadrature signals one first needs to produce two sets of quadrature signals phase separated by $$\frac{\pi}{4}$$

or 45°, where analogue sine and cosine signals are separately fed into analogue to digital as illustrated in FIG. 12 converters (ADC) 600, 601. The digital output from these two converters 600, 601 is fed into a programmable gate array 602 to produce the required digital quadrature signals phase separated by $$\frac{\pi}{4}.$$

These signals are then fed to e.g. the processor 107 for motion estimation using the constellation of states method, which may or may not contain a digital filter. Additional phase interpolation could be achieved by timing the interval between quadrature transitions and assume that the time required for the next transition was the same as the last transition, and the phase is obtained from the time interval. The difference between the traditional methods and the one required with this invention is that the quadrature samples are taken in high rate bursts separated by significantly longer time intervals. To synchronise the data sampling and data processing rates quad count and phase interpolation need to be stored in a memory buffer so that they become available for the processing unit on demand.

Additional benefits obtained from this invention include:

Since the processing system has a knowledge of the instantaneous velocity it can modify the signals from the processor to compensate for the changes in phase of the quadrature signals as a function of velocity or change in latency of the processing electronics. This is particularly useful in closed loop systems as it is possible to build "lag free" control systems and help to reduce servo-control induced resonances and to increase the effective bandwidth.

Low rate sampling by using undersampling techniques permits time division multiplexing of many quadrature channels. This may be particularly useful in interferometric applications where one could use a single laser to measure many axes of motion and still maintain high signal levels without the need to reduce their bandwidth and or their resolution as in the case of amplitude division to obtain phase information. In this case the laser beam is optically switched between the axes with the rate determined by the low rate sampling counter.

Figure 13:
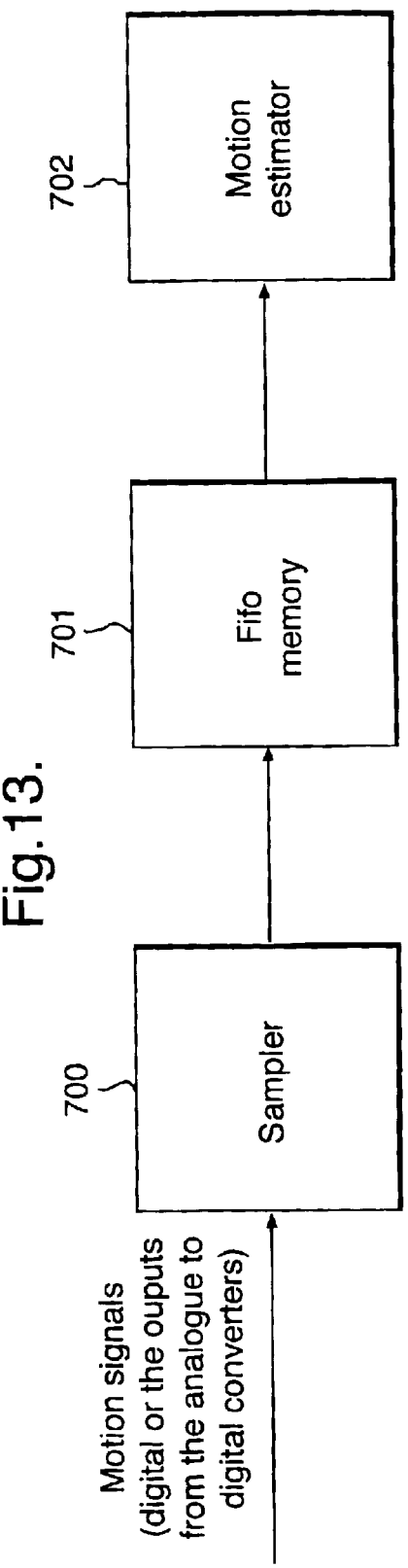
FIG. 13 shows an arrangement for sampling motion signals.
Figure 14:
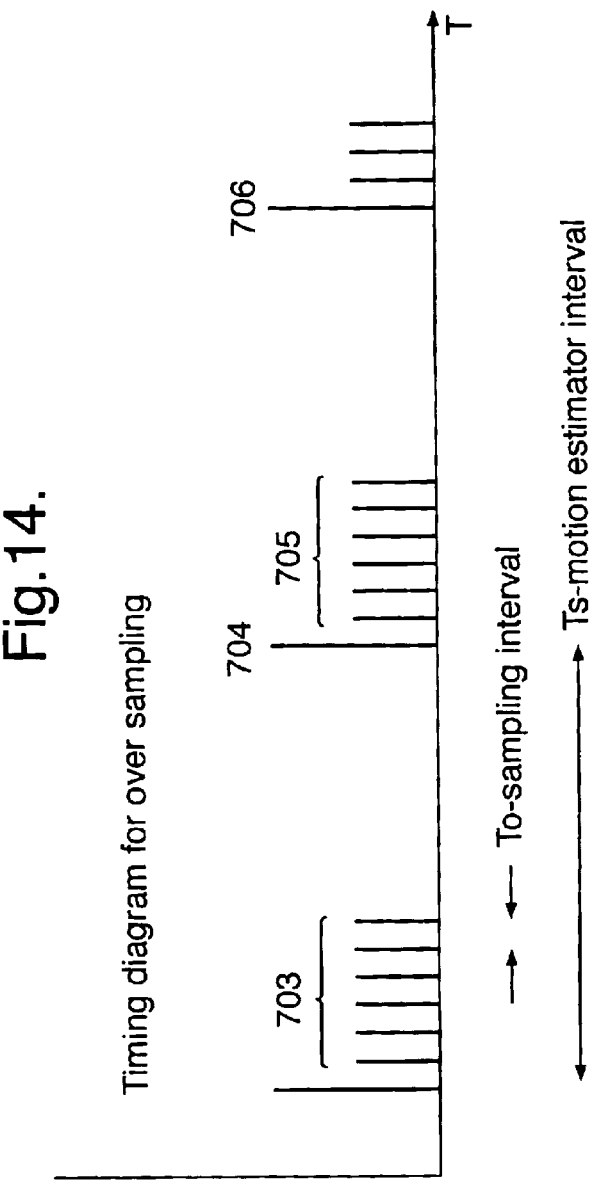
FIG. 14 is a timing diagram for the sampling analysis carried out by the arrangement of FIG. 13.

A further advantage which may be obtained using the present invention is that it is no longer necessary to monitor continuously the signals to ensure appropriate accuracy. This accuracy permits the use of the concept of over sampling. In such arrangements, the process signals are derived from a plurality of samples from the sensors. This is illustrated further in FIG. 13 in which the signals representing motion, which can be digital signals or the outputs of the analogue to digital converters 103, 106 in FIG. 1, are passed via a sampler 700 which samples at a predetermined sampling interval which is relatively short, and the sampled values are stored in a FIFO memory 701 before being passed to a motion estimator 702 which processes the plural values in the memory 701 to derive an appropriate estimate of motion. Thus, the estimator 702 computes the estimation at time intervals of $T_s$ but the position is sampled at intervals of $t_o$, which allows for up to n readings to be stored between updating of the motion estimation, where $n=t_o/t_s$. This is further illustrated in FIG. 14 in which samples 703 are used to derive motion estimate at time 704, samples 705 are used to derive the motion estimation at time 706, etc.

It would be possible for the motion estimator 702 simply to use an average of the sampled values. However, this is not always the best arrangement and other possibilities include applying filtering with weight functions to combat noise, and possibly to derive short term estimates of velocity, acceleration or higher derivatives.

A laser interferometer with which the present invention may be used to determine the movement of two objects will now be described with reference to FIG. 15.

Figure 15:
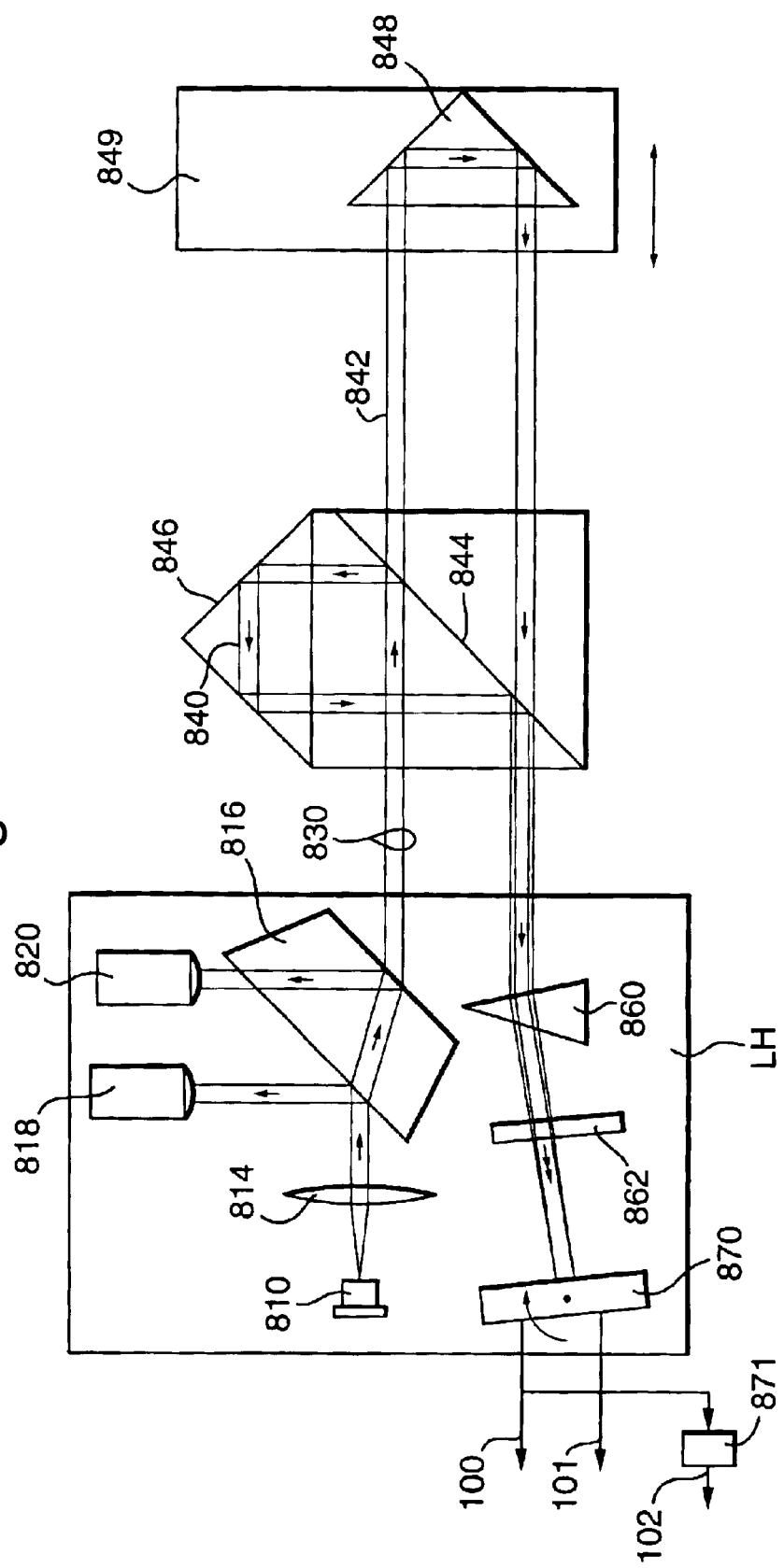
FIG. 15 is a schematic laser interferometer with which the present invention may be used.

In FIG. 15, a laser in the form of a diode 810 emits a beam of laser light, which is collimated by a lens 814. The beam 812 subsequently passes through a prism 816 which deflects part of the beam 812 into temperature and frequency stabilisation channels 818, 820 for the laser diode 810. The output beam 830 of the frequency stabilised unit is incident upon a polarising cubic beam splitter 844, which splits the beam 830 into two linearly orthogonally polarised beam 840, 842 propagating in orthogonal directions. The beam 840 is directed into a reference optical path provided by a retroreflector 846, whose position is fixed relative to the polarising cubic beam splitter 844. Beam 842 continues undiverted into a measuring optical path in the form of a retroreflector 848, fixedly connected to a first object 849 whose displacement is to be determined. Beam 840 and 842 are reflected parallel to their incident path by retroreflectors 846 and 848; beam 840 is additionally reflected by beam splitter 844 in a return direction toward the laser head LH, formally the second object.

However, the geometry of beam splitter cube 844 and retroreflector 846 are such that the beams 840 and 842 are no longer coaxial but may partially overlap when reflected towards the laser head LH, but nonetheless remain parallel. Upon entering the laser head LH, the beams 840, 842 pass through a birefringent element, provided in this example by a "calcite" wedge prism 860 which refracts the beam 840, 842 through an angle which is dependent on their polarisation state, and thereby has the effect of converging the beams. A Polaroid 862 is subsequently provided in the path of the convergent beams to mix their polarisation states, thereby enabling interference between the beams 840, 842 for the first time.

Because the beams 840, 842 are interfering as a result of their mutual convergence, rather than co-axial superposition (as is usual with a laser interferometer) a spatial fringe field will be generated in a plane transverse to the direction of travel of the beams 840, 842. The periodicity of the fringe field will be determined by the convergence angle of the two interfering beams. To detect the fringe field, and the resultant lateral shift upon linear movement of retroreflector 848, an electrograting photodetector 870 is provided.

The above description of FIG. 15 is derived from the disclosure of GB-A-2296766 referred to previously. The photodetector 870 then generates sine and cosine signals 100, 101 by suitable arrangements of the sensitive elements (not shown) of the photodetector 870. The sine signal is also passed to an inverter 871 to generate the not sine signal 104.

What is claimed is:

1. An apparatus for determining movement, comprising means for generating at least two signals of different phase in dependence on the relative position of two objects, movement of said two objects causing corresponding changes in said at least two signals; and a processor for processing said at least two signals, thereby to determine said movement, the processing by said processor being on the basis of locating the constellation states of successive values of the at least two signals in at least one co-ordinate axis system, said at least one co-ordinate axis system defining at least six separate segments rotationally displaced, and said processor is arranged to monitor the relative change in said constellation states of the successive values by using at least two processed data samples, said successive samples being obtained by sampling said at least two signals at a predetermined clock rate.

2. An apparatus according to claim 1, wherein said at least one co-ordinate axes system comprises first and second co-ordinate axes systems each with a plurality of axes defining at least three segments, the axes of the second co-ordinate axis system being rotationally displaced relative to the axes of the first co-ordinate axis system.

3. An apparatus according to claim 2, wherein prior to sampling a processed data sample, one of the coordinate axis systems is rotated relative to the previous data sample such that the angular position of the previous data sample with respect to this rotated co-ordinate axis system is known.

4. An apparatus according to claim 1, wherein said processor is arranged to derive a prediction of one of said successive values of said constellation states from at least two of said successive values of said constellation states preceding said one value, and to compare said prediction with the corresponding location of said one successive value.

5. An apparatus according to claim 4, wherein said prediction is derived on the basis of a predetermined constraint on permitted variations in said successive values.

6. An apparatus according to claim 5, wherein said predetermined constraint is a maximum permitted change in velocity.

7. An apparatus according to claim 5, wherein said predetermined constraint is a maximum permitted charge in acceleration.

8. An apparatus according to claim 1, wherein the processor is arranged to determine the separations of each successive value from two adjacent axes of said at least one co-ordinate axis systems.

9. An apparatus according to claim 8, wherein said processor is further arranged to determine the ratio of said separations.

10. An apparatus according to claim 1, wherein each of said successive samples are obtained by sampling said at least two signals at a predetermined interval.

11. An apparatus according to claim 1, wherein each of said successive samples is obtained from a plurality of values of said at least two signals.

12. An apparatus according to claim 1, further comprising:
   means for filtering over a frequency band which is narrow relative to the maximum bandwidth of said signals, said filtering means including means for varying the central frequency of said band over said maximum bandwidth, in dependence on a value derived from at least two data samples processed by said processor.

13. An apparatus according to claim 12, wherein said derived value is a prediction determined from said at least two data samples and a velocity requirement of said movement.

14. An apparatus according to claim 13, wherein the processing by said processor is on the basis of locating the constellation states of successive values of the at least two signals in at least one co-ordinate axis system said processor is arranged to derive said prediction, being a prediction of one of said successive values of said constellation states, from at least two of said successive values of said constellation states preceding said one value.

15. An apparatus according to claim 12, wherein said filtering means has means for varying the frequency width of said bandwidth in dependence on an acceleration measurement determined from said signals by said processor.

16. An apparatus according to claim 12, wherein said filtering means is arranged to filter said signals in analogue form.

17. An apparatus according to claim 12, wherein said filtering means is arranged to filter said signals in digital form.

18. An apparatus for determining movement, comprising means for generating at least two signals of different phase in dependence on the relative position of two objects, movement of said two objects causing corresponding changes in said at least two signals, and a processor for processing said at least two signals, thereby to determine said movement, the processing by said processor being on the basis of locating the constellation states of successive values of the at least two signals in at least first and second co-ordinate axis systems, said at least first and second coordinate axis systems each defining at least three separate segments rotationally displaced, and said processor is arranged to monitor the relative change in said constellation states of the successive values by using at least two processed data samples, said successive samples being obtained by sampling said at least two signals at a predetermined clock rate.

19. An apparatus according to claim 18, wherein each of said first and second co-ordinate axis systems has a plurality of axes defining said at least three segments, and the axes of said first one of said co-ordinate axis systems are rotationally displaced relative to the axes of the said second of said co-ordinate axis systems.

20. An apparatus according to claim 18, wherein each of said first and second co-ordinate axis systems has a plurality of axes defining said at least three segments, and at least one axis of each of said first and second co-ordinated axis systems are coincident.

21. An apparatus according to claim 18, wherein said first and second co-ordinate axis systems having the same number of axes.

22. An apparatus according to claim 18, wherein said first and second co-ordinate axis systems have different numbers of axes.

23. An apparatus according to claim 18, wherein prior to sampling a processed data sample, one of the co-ordinate axis systems is rotated relative to the previous data sample such that the angular position of the previous data sample with respect to this rotated co-ordinate axis system is known.

24. An apparatus according to claim 18, wherein said processor is arranged to derive a prediction of one of said successive values of said constellation states from at least two of said successive values of said constellation states preceding said one value, and to compare said prediction with the corresponding location of said one successive value.

25. An apparatus according to claim 18, wherein said prediction is derived on the basis of a predetermined constraint on permitted variations in said successive values.

26. An apparatus according to claim 25, wherein said predetermined constraint is a maximum permitted change in velocity.

27. An apparatus according to claim 25, wherein said predetermined constraint is a maximum permitted charge in acceleration.

28. An apparatus according to claim 18, wherein the processor is arranged to determine the separations of each successive value from two adjacent axes of said at least one co-ordinate axis systems.

29. An apparatus according to claim 28, wherein said processor is further arranged to determine the ratio of said separations.

30. An apparatus according to claim 18, wherein each of said successive samples are obtained by sampling said at least two signals at a predetermined interval.

31. An apparatus according to claim 18, wherein each of said successive samples is obtained from a plurality of values of said at least two signals.

32. A method of determining movement, comprising generating at least two signals of different phase in dependence on the relative position of two objects, movement of said two objects causing corresponding changes in said at least two signals; and processing said at least two signals, thereby to determine said movement, being on the basis of locating the constellation states of successive values of the at least two signals in at least one co-ordinate axis system, said at least one co-ordinate axis system defining at least six separate segments rotationally displaced, and said processing includes monitoring the relative change in said constellation states of the successive values by using at least two processed data samples, said successive samples being obtained by sampling said at least two signals at a predetermined clock rate.

33. The method according to claim 32, further comprising:
   filtering over a frequency band which is narrow relative to a maximum bandwidth of said signals, said filtering includes varying a central frequency of said band over said maximum bandwidth, in dependence on a value derived from at least two data samples processed from said signals.

34. A method of determining movement, comprising generating at least two signals of different phase in dependence on the relative position of two objects, movement of said two objects causing corresponding changes in said at least two signals; and processing said at least two signals, thereby to determine said movement, the processing being on the basis of locating the constellation states of successive values of the at least two signals in at least first and second co-ordinate axis systems, said at least first and second co-ordinate axis systems each defining at least three separate segments rotationally displaced, and said processing includes monitoring the relative change in said constellation states of the successive values by using at least two processed data samples, said successive samples being obtained by sampling said at least two signals at a predetermined clock rate.

35. An apparatus for determining movement, comprising:
   means for generating two signals of different phase in dependence on the relative position of two objects, the movement of said two objects producing corresponding changes in said two signals;
   a processor for processing said two signals, thereby to determine said movement whereby the means for processing is on the basis of locating successive values of constellation states of the two signals in a first co-ordinate axis system comprising an axis radiating from an origin, said processing means being arranged to monitor the relative change in said constellation states of the successive values by using at least a first and a second data samples which are obtained by sampling the two signals over time;
   wherein a second co-ordinate axis system comprising an axis radiating from an origin is provided whereby the second co-ordinate axis system is rotatable and prior to sampling the second data sample the second co-ordinate axis system is rotated relative to the first data sample such that the angular position of the first data sample with respect to the second co-ordinate axis system is known.

36. An apparatus according to claim 35 wherein the rotatable co-ordinate axis system is rotated such that the first data sample is substantially aligned to the axis of the rotatable axis system.

37. An apparatus according to claim 36, wherein said prediction is derived on the basis of a predetermined constraint on permitted variations in said successive values.

38. An apparatus according to claim 35 wherein the rotatable co-ordinate axis system comprises two further axes which define the forbidden zone.

39. An apparatus according to claim 35 wherein the change in the constellation states that is monitored is one of change in displacement, velocity or acceleration.

40. An apparatus according to claim 35 wherein the processor is arranged to derive a prediction of a successive value of the constellation of states from a previous value of the constellation states, and to compare the prediction with the corresponding location of the successive value.

41. An apparatus according to claim 40 wherein the prediction is derived on the basis of a predetermined constraint on permitted variations in the successive values.

42. An apparatus according to claim 41 wherein the predetermined constraint is velocity, acceleration or a higher order derivative.

43. An apparatus according to claim 35 wherein the processor is arranged to derive a prediction of a successive value of the constellation of states from at least two previous values of the constellation states, and to compare the prediction with the corresponding location of the successive value.

44. A method of determining movement, comprising
   generating at least two signals of different phase in dependence on the relative position of two objects whereby movement of the two objects pauses corresponding changes in the at least two signals;
   sampling the at least two signals to obtain a data sample;
   processing the data sample, on the basis of locating the constellation states of the at least two signals in a first relatively fixed co-ordinate axis system which comprises an axis radiating from an origin,
   rotating a second rotatable co-ordinate axis system with respect to the first co-ordinate axis system and the processed data sample such that the angular position of the data sample with respect to the second rotatable co-ordinate axis system is known wherein the second rotatable co-ordinate axis system comprises an axis radiating from an origin; and
   sampling the at least two signals to obtain a further data sample.

45. A method according to claim 44 wherein the second rotatable co-ordinate axis system defines a movable angular region of uncertainty whereby, if the further data sample lies within this region, an error is flagged.

* * * * *